(12) United States Patent
Strobel

(10) Patent No.: US 12,252,280 B2
(45) Date of Patent: Mar. 18, 2025

(54) DOCKING STATION WITH RETRACTABLE GUIDE APPARATUS FOR UNMANNED AERIAL VEHICLE

(71) Applicant: 10112755 Canada Inc., St. John's (CA)

(72) Inventor: Armin Strobel, St. John's (CA)

(*) Notice: Subject to any disclaimer, the term of this patent is extended or adjusted under 35 U.S.C. 154(b) by 82 days.

(21) Appl. No.: 17/791,826

(22) PCT Filed: Jan. 11, 2021

(86) PCT No.: PCT/CA2021/050019
§ 371 (c)(1),
(2) Date: Jul. 8, 2022

(87) PCT Pub. No.: WO2021/138748
PCT Pub. Date: Jul. 15, 2021

(65) Prior Publication Data
US 2023/0039483 A1    Feb. 9, 2023

Related U.S. Application Data

(60) Provisional application No. 62/959,905, filed on Jan. 11, 2020.

(51) Int. Cl.
*B64U 80/70* (2023.01)
*B64C 3/56* (2006.01)
(Continued)

(52) U.S. Cl.
CPC ............... *B64U 80/70* (2023.01); *B64C 3/56* (2013.01); *B64U 10/20* (2023.01); *B64U 30/12* (2023.01);
(Continued)

(58) Field of Classification Search
CPC . B64U 70/97; B64U 80/70; B64F 1/22; B64F 1/222
See application file for complete search history.

(56) References Cited

U.S. PATENT DOCUMENTS 11,767,110 B2 * 9/2023 Falk-Petersen ........... B64C 1/30
244/63
12,116,143 B2 * 10/2024 Howe ....................... B64F 1/04
(Continued)

FOREIGN PATENT DOCUMENTS

CN      108528746 A  *  9/2018  ................ B64F 1/00
EP         3241747 A1 *  11/2017  ........... B64C 39/024
(Continued)

OTHER PUBLICATIONS

Translation of EP 3241747 (Year: 2017).*
(Continued)

*Primary Examiner* — Joshua J Michener
*Assistant Examiner* — Ryan Andrew Yankey
(74) *Attorney, Agent, or Firm* — Borden Ladner Gervais; Richard A. Johnson

(57) ABSTRACT

Disclosed is a docking station for use with an unmanned aerial vehicle (UAV). The docking station has a retractable guide apparatus having a retracted state in which the retractable guide apparatus is retracted within the docking station and an expanded state in which the retractable guide is expanded outward from the docking station for physically guiding the UAV into the docking station. Given that the guide apparatus is retractable, the retractable guide apparatus is provided with some protection from environmental factors such as exposure to ice, snow and high winds.

29 Claims, 27 Drawing Sheets

(51) Int. Cl.
  *B64U 10/20* (2023.01)
  *B64U 30/12* (2023.01)
  *B64U 50/37* (2023.01)
  *B64U 70/95* (2023.01)
  *B64U 70/97* (2023.01)
  *B64U 80/25* (2023.01)
(52) U.S. Cl.
  CPC ............. *B64U 50/37* (2023.01); *B64U 70/95* (2023.01); *B64U 70/97* (2023.01); *B64U 80/25* (2023.01)

(56) References Cited

U.S. PATENT DOCUMENTS

| | | | |
|---|---|---|---|
| 2009/0236470 A1* | 9/2009 | Goossen | B64F 1/04 244/115 |
| 2010/0012774 A1* | 1/2010 | Fanucci | F42B 15/105 244/49 |
| 2015/0266575 A1* | 9/2015 | Borko | B64C 39/024 244/17.23 |
| 2020/0262583 A1* | 8/2020 | Ducharme | B64C 25/32 |
| 2020/0290752 A1* | 9/2020 | Kolosiuk | B64U 70/30 |
| 2024/0262543 A1* | 8/2024 | Howe | B64U 80/10 |
| 2024/0262544 A1* | 8/2024 | Howe | B64U 50/34 |

FOREIGN PATENT DOCUMENTS

| | | | | |
|---|---|---|---|---|
| JP | 2018192932 A | * | 12/2018 | |
| WO | WO-2018039784 A1 | * | 3/2018 | .......... B64C 39/024 |
| WO | WO-2024129236 A1 | * | 6/2024 | |

OTHER PUBLICATIONS

International Search Report and Written Opinion for international application No. PCT/CA2021/050019 dated Mar. 31, 2021, 9 pages.

* cited by examiner

DOCKING STATION WITH RETRACTABLE GUIDE APPARATUS FOR UNMANNED AERIAL VEHICLE

RELATED APPLICATIONS

This patent application is the U.S. national stage of International Application No. PCT/CA2021/050019 filed on Jan. 11, 2021, which in turn claims priority to U.S. Provisional Patent Application No. 62/959,905 filed on Jan. 11, 2020. Both International Application No. PCT/CA2021/050019 and U.S. Provisional Patent Application No. 62/959,905 are hereby incorporated herein by reference in their entirety.

FIELD OF THE DISCLOSURE

This disclosure relates to aviation, and more particularly to Unmanned Aerial Vehicles (UAVs) and docking stations for the same.

BACKGROUND

Unmanned Aerial Vehicles (UAVs), or autonomous drones, are rapidly increasing in functionality and affordability. They are becoming ubiquitous in a wide variety of industries, such as supply chain/warehouse management, agriculture, transportation, oil and gas, and infrastructure. One such type of UAV is a vertical take-off and landing (VTOL) ducted-fan UAV.

A ducted-fan UAV has a fuselage, a duct with a fan/propeller within the duct, and control surfaces or vanes. Some call it also Singlecopter (which could actually have two counter rotating rotors) or Tailsitter which is a more generic description. A UAV may also have stators that interact with the fan/propeller to stabilize airflow. The fan/propeller is configured to rotate to produce lift. The lift generated by the fan/propeller is controlled to alter an altitude of the UAV during flight. The control surfaces or vanes of the UAV control thrust, thereby vectoring to power an orientation of the UAV during flight.

Many UAVs are deployed and recovered from a location on ground. Deployment and recovery of a UAV typically involves a person to be present to ensure proper deployment and recovery. Unfortunately, the location could be dangerous or hazardous for the person. Furthermore, there can be costs in terms of paying the person a salary and transporting the person to/from the location, which can increase overall costs and introduce delays as well.

It is therefore an object to at least partially mitigate some or all of the disadvantages identified above.

SUMMARY OF THE DISCLOSURE

Disclosed is a docking station for use with an unmanned aerial vehicle (UAV). The docking station has a retractable guide apparatus having a retracted state in which the retractable guide apparatus is retracted within the docking station and an expanded state in which the retractable guide is expanded outward from the docking station for physically guiding the UAV into the docking station.

Given that the guide apparatus is retractable, the retractable guide apparatus is provided with some protection from environmental factors such as exposure to ice, snow and high winds. This can help to increase durability and reliability, such that the UAV can reliably land in the docking station without any personnel being present. Deployment is also possible without any personnel being present. Therefore, it is possible to avoid or mitigate the costs associated with personnel.

Also disclosed is a UAV. The UAV has a fuselage, a duct connected to the fuselage, a rotating fan or propeller disposed within the duct and configured to provide lift to the UAV, and a pair of wings configurable between an extended state in which the wings are extended outward to provide lift for horizontal flight and a compact state in which the wings are not extended outward to allow the UAV to fit into a docking station.

Also disclosed is a system having a UAV and a docking station as summarized above.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

INTRODUCTION

Figure 1:
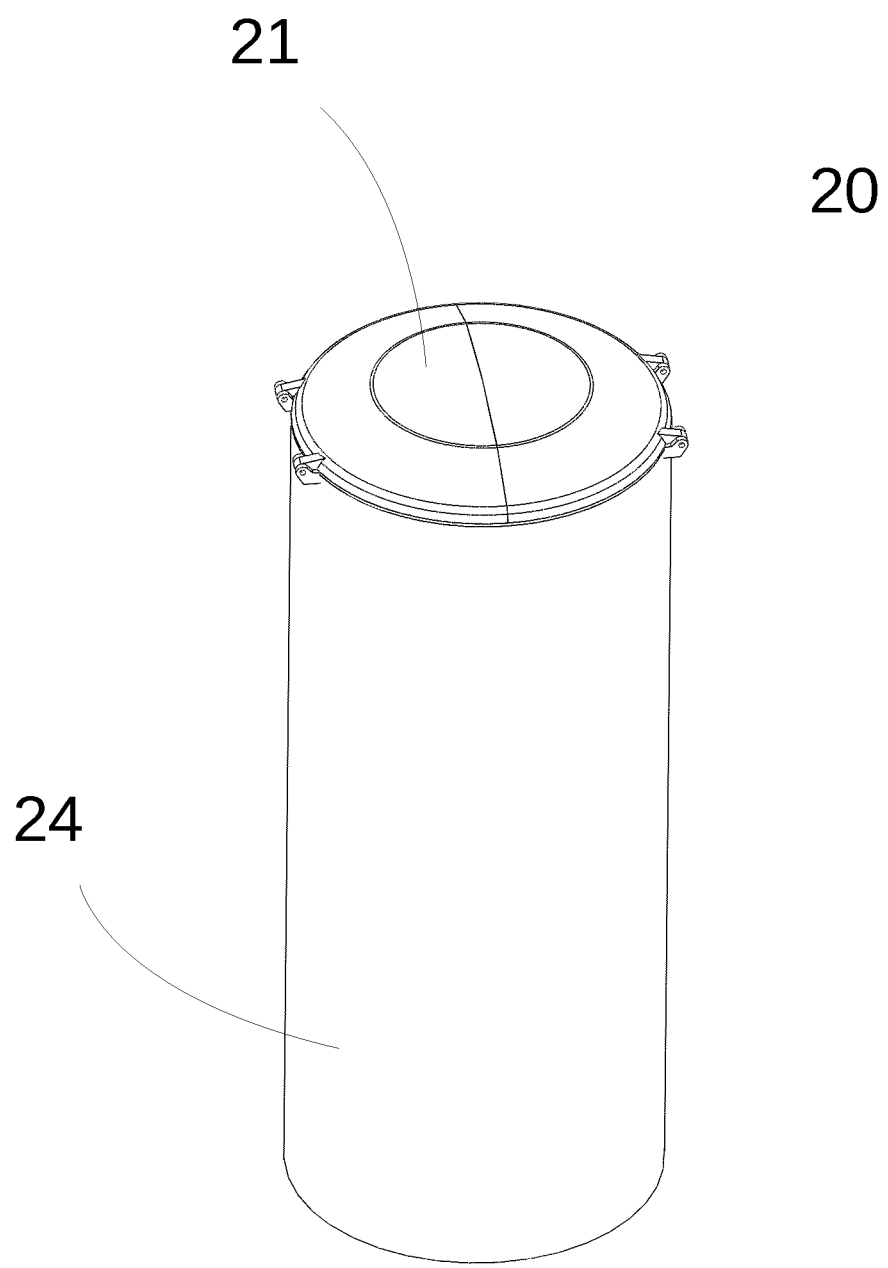
FIGS. 1 and 1a are perspective views of a docking station with a closed lid.
Figure 1A:
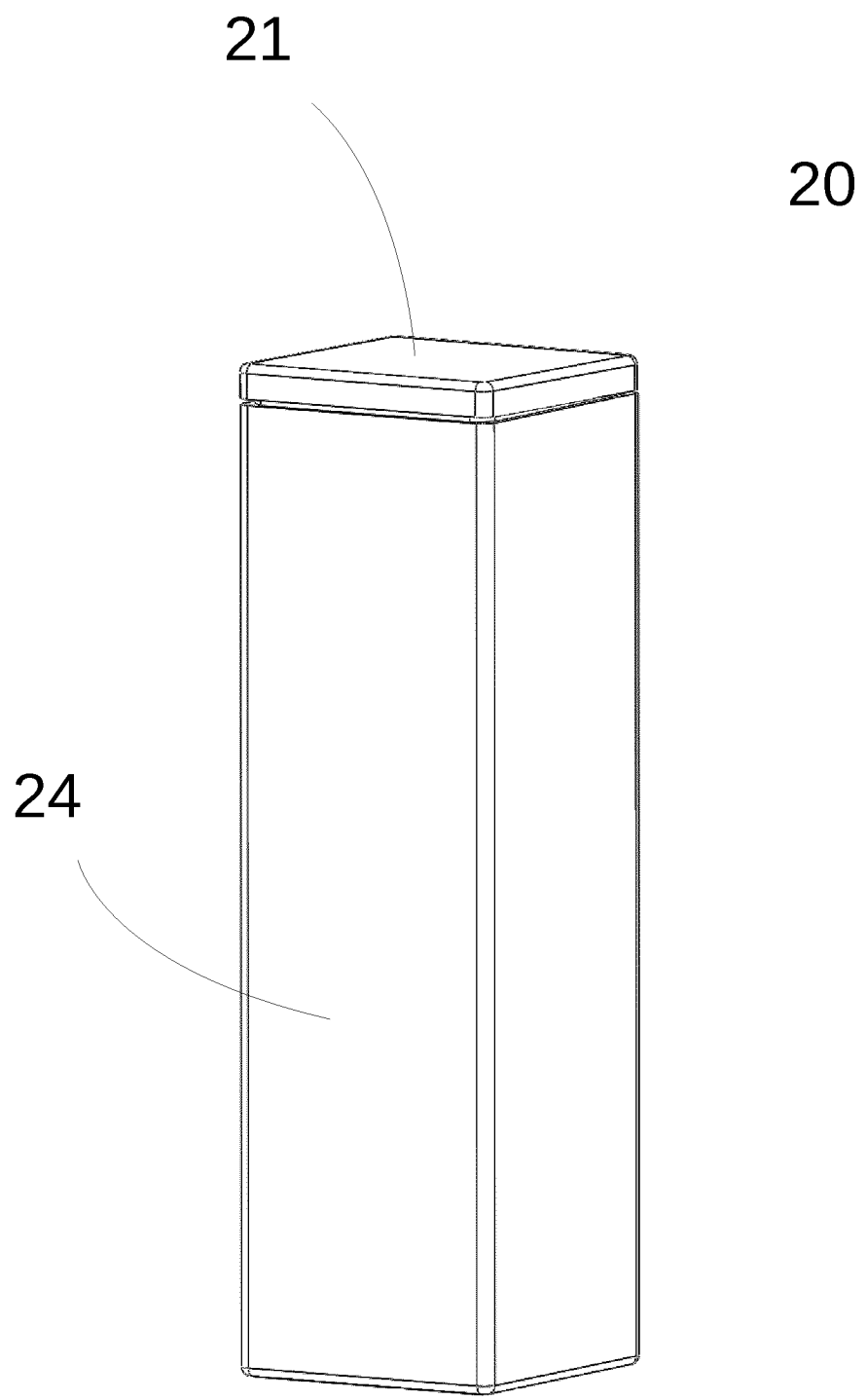

FIGS. 1 and 1a are perspective views of a docking station 20 with a closed lid 21. The docking station 20 has an outside cover 24 and a retractable guide apparatus 22 (not shown) that is retracted inside the outside cover 24. There are many possibilities for the shape of the docking station 20. The docking station 20 can have a cylindrical shape as shown in FIG. 1, a rectangular prism shape as shown in FIG. 1a, or any other appropriate shape.

Figure 2:
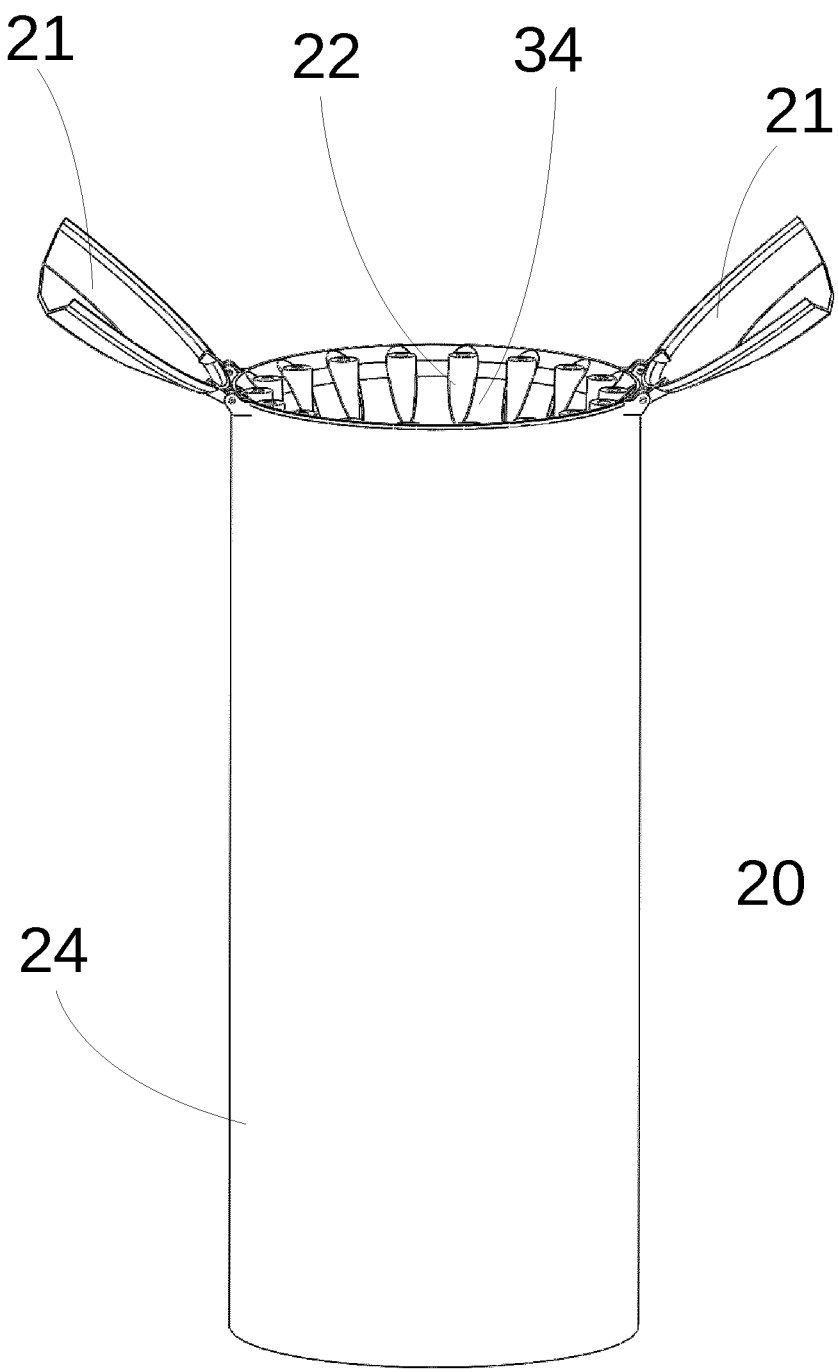
FIGS. 2 and 2a are perspective views of the docking station with an open lid.
Figure 2A:
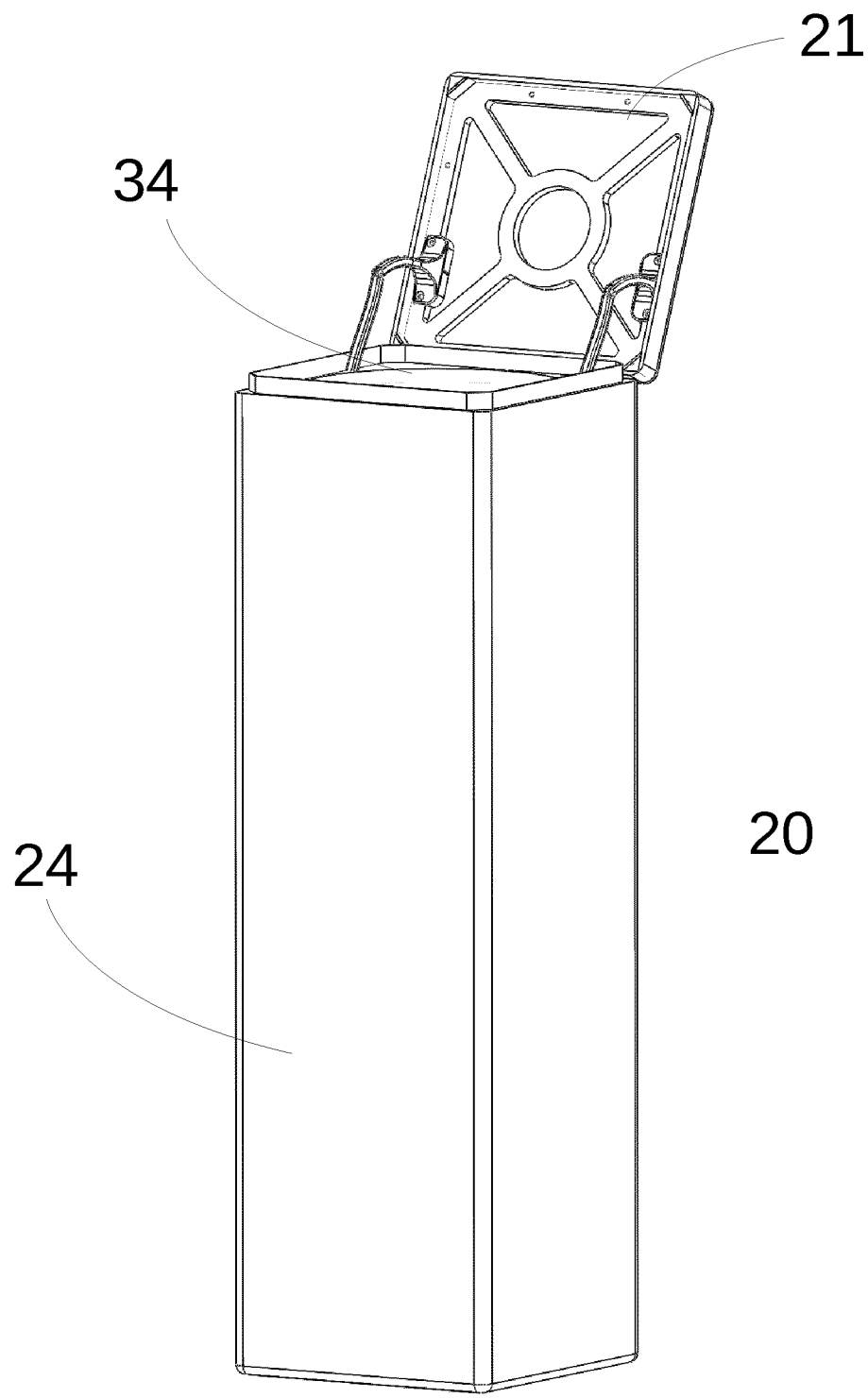

FIGS. 2 and 2a are perspective views of the docking station 20 with an open lid 21, thereby partially revealing the retractable guide apparatus 22 inside the outside cover 24. The lid 21 can be opened when deploying a UAV 120 (not shown) from within the docking station 20 or when receiving the UAV 120 into the docking station 20. The deployment and the reception of the UAV 120 will be described below with reference to FIGS. 3 to 12.

Figure 3:
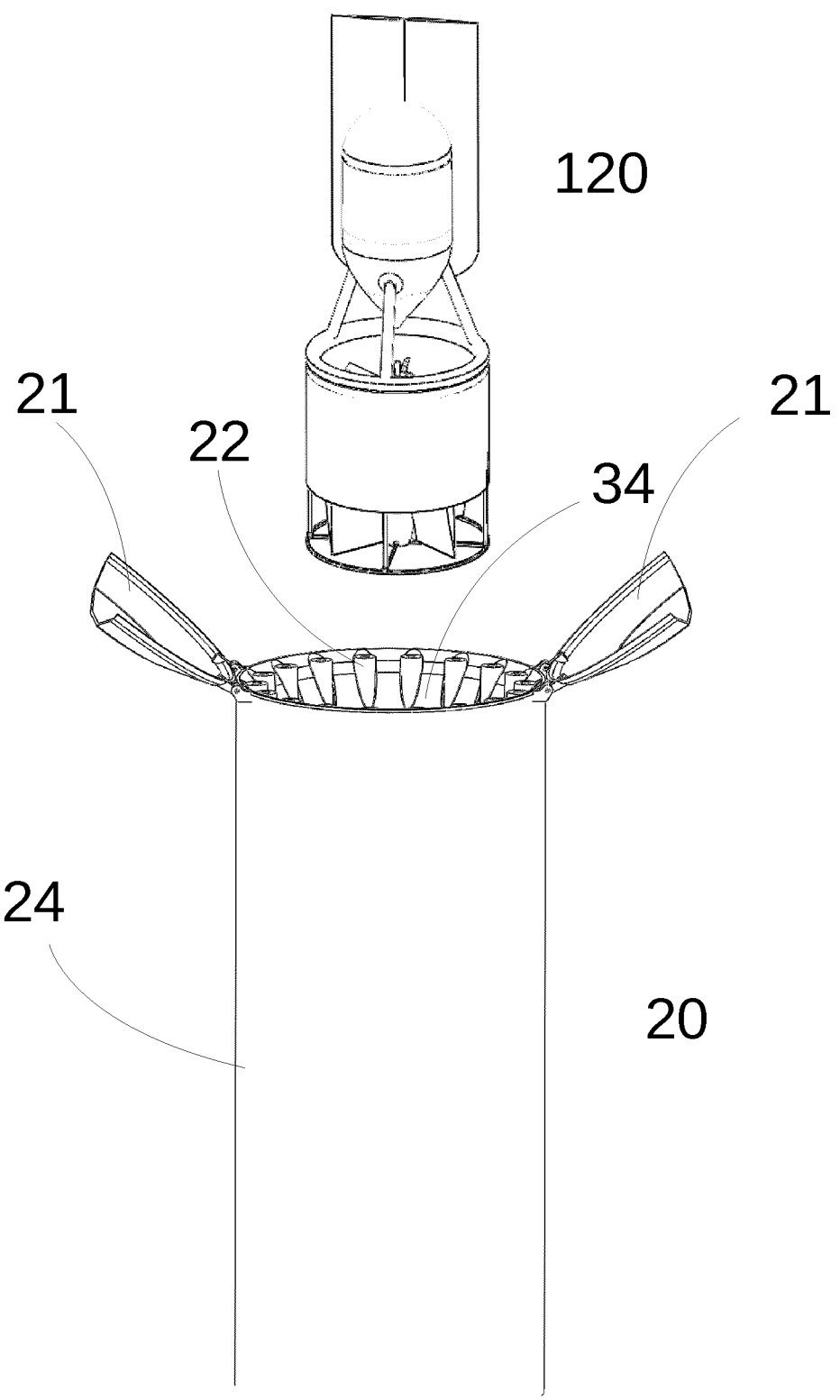
FIG. 3 is a perspective view of the docking station with an open lid and where a UAV is deployed.
Figure 4:
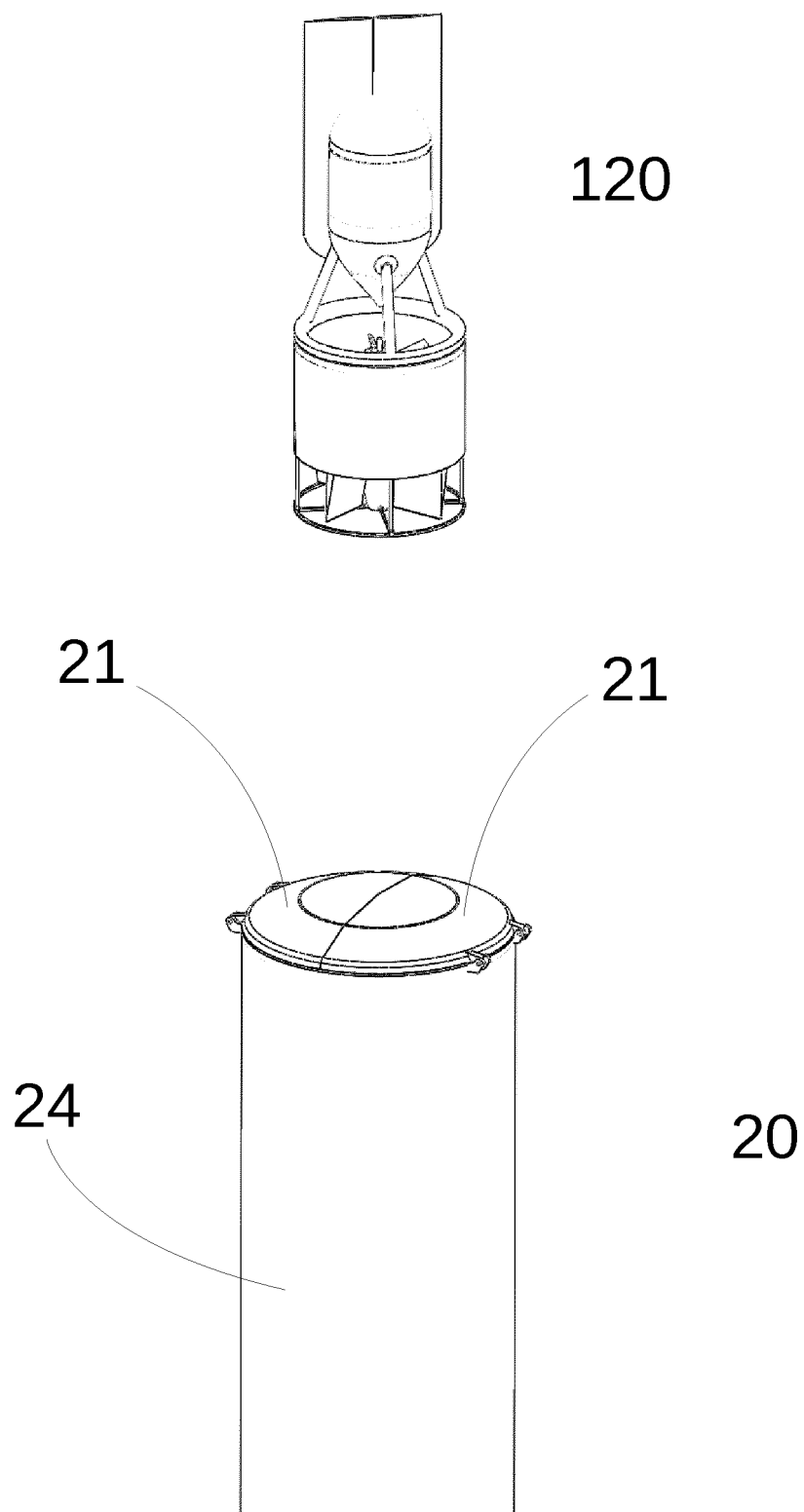
FIG. 4 is a perspective view of the docking station with a closed lid after the UAV is deployed.

FIG. 3 shows a perspective view of the docking station 20 with an open lid 21 and where the UAV 120 is being deployed. In the illustrated example, the UAV 120 is a vertical take-off and landing (VTOL) ducted-fan UAV 120. However, it is to be understood that other types of UAVs (e.g. single-rotor, multi-rotor, fixed-wing, VTOL, and ducted-fan UAVs) are possible and are within the scope of the disclosure. After deployment of the UAV 120, the lid 21 can close. FIG. 4 is a perspective view of the docking station 20 with a closed lid 21 after the UAV 120 is deployed.

Figure 5:
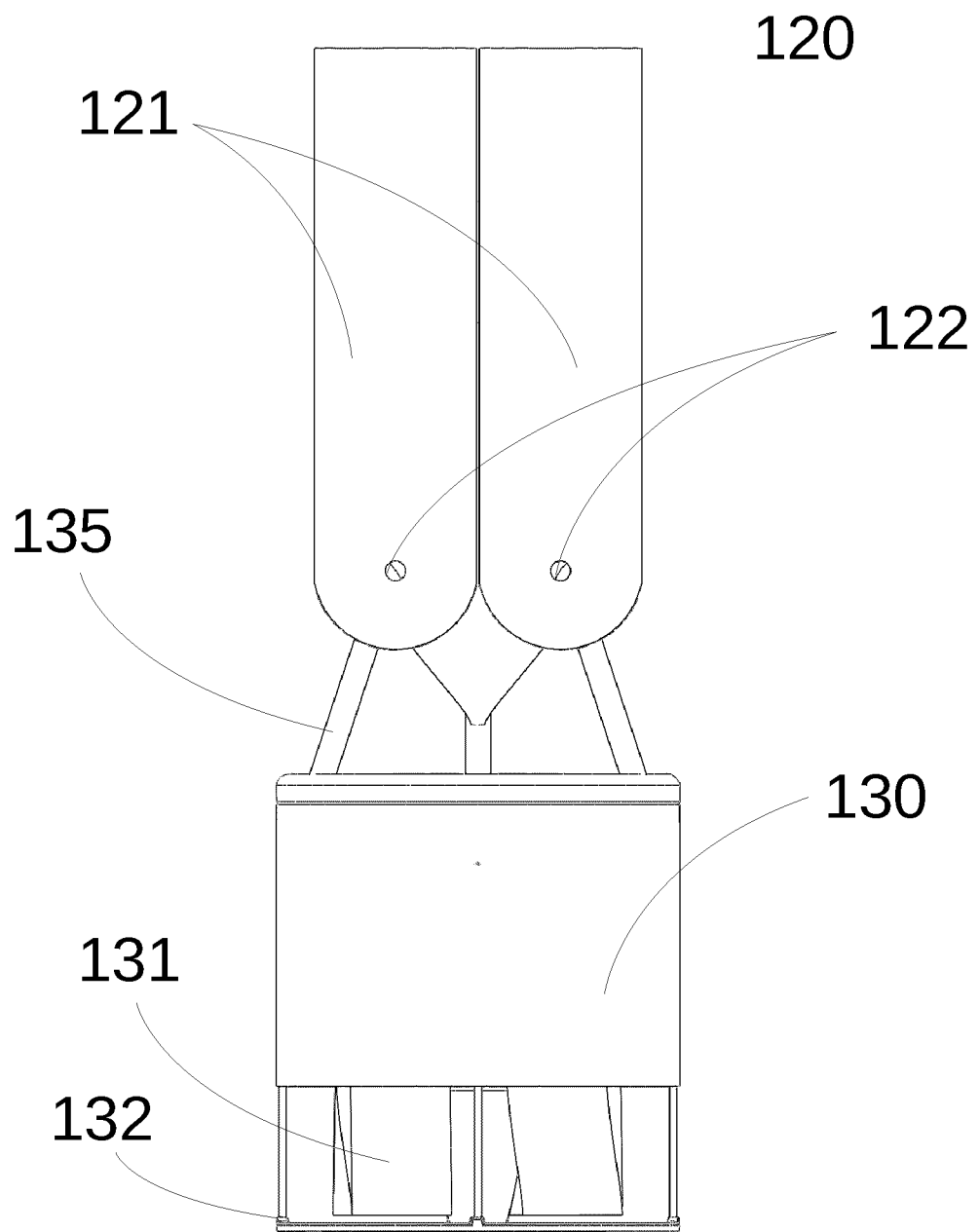
FIGS. 5 and 5a are side and perspective views of the UAV in a compact state with its wings folded upwards shortly after deployment.
Figure 5A:
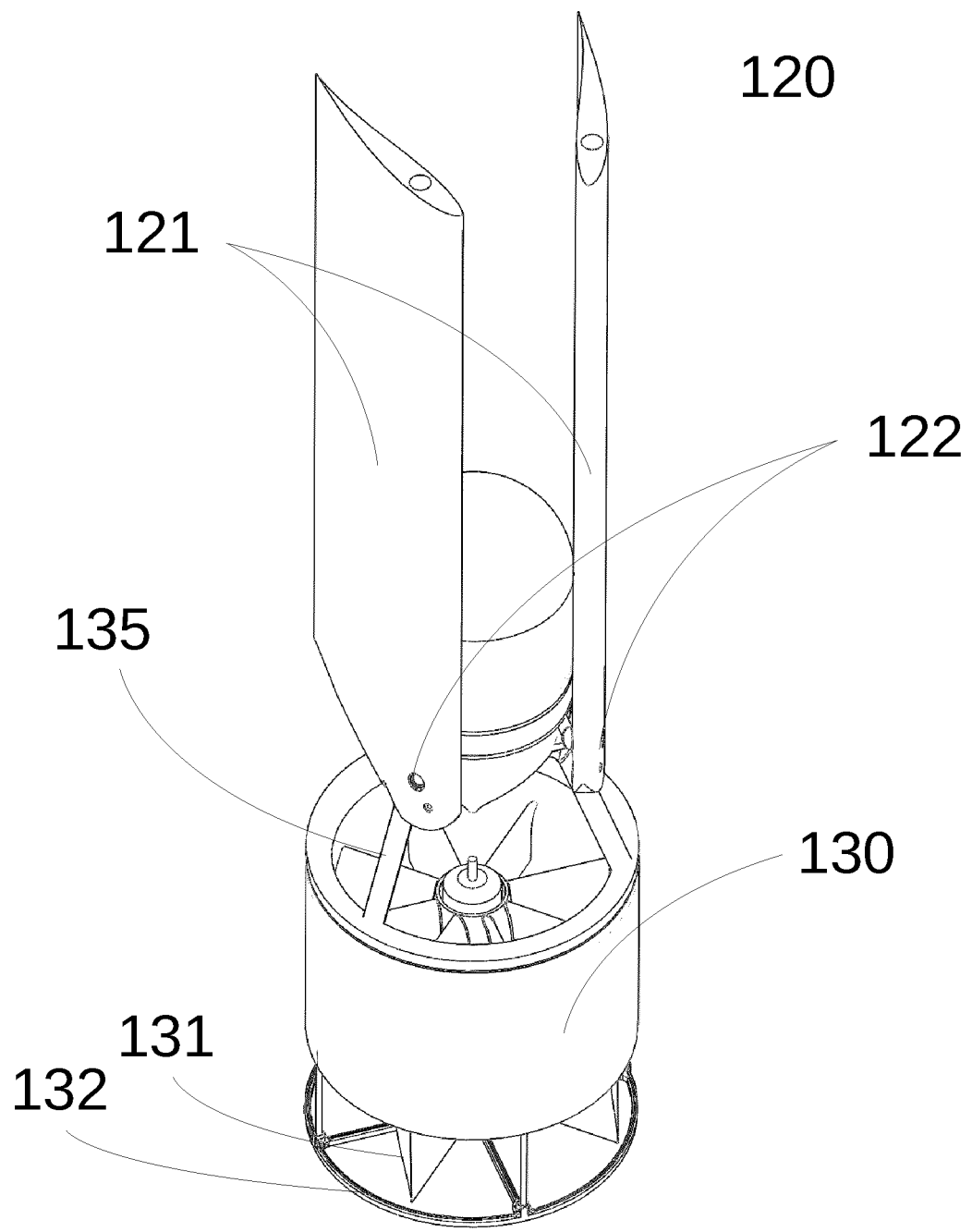

In some implementations, the UAV 120 has wings 121 that are folded up in a compact state when the UAV 120 is being deployed from the docking station 20. The compact state enables the UAV 120 to fit within the docking station 20. FIGS. 5 and 5a are side and perspective views of the UAV 120 in the compact state with its wings 121 folded upwards shortly after deployment. In some implementations, the UAV 120 can operate in a hover mode while in the compact state after deployment.

Figure 6:
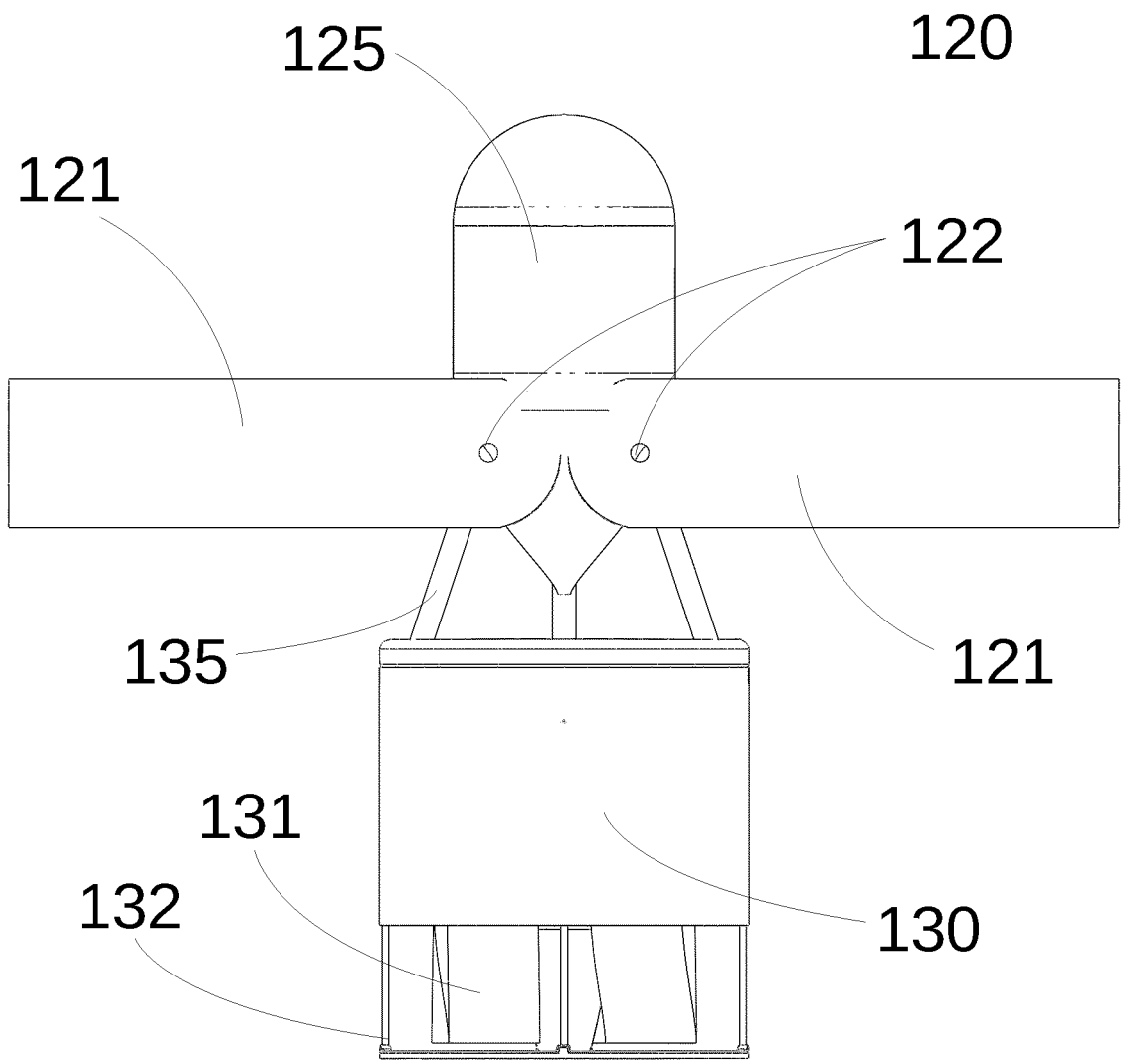
FIG. 6 is a side view of the UAV in an extended state with its wings folded outward after deployment.
Figure 6A:
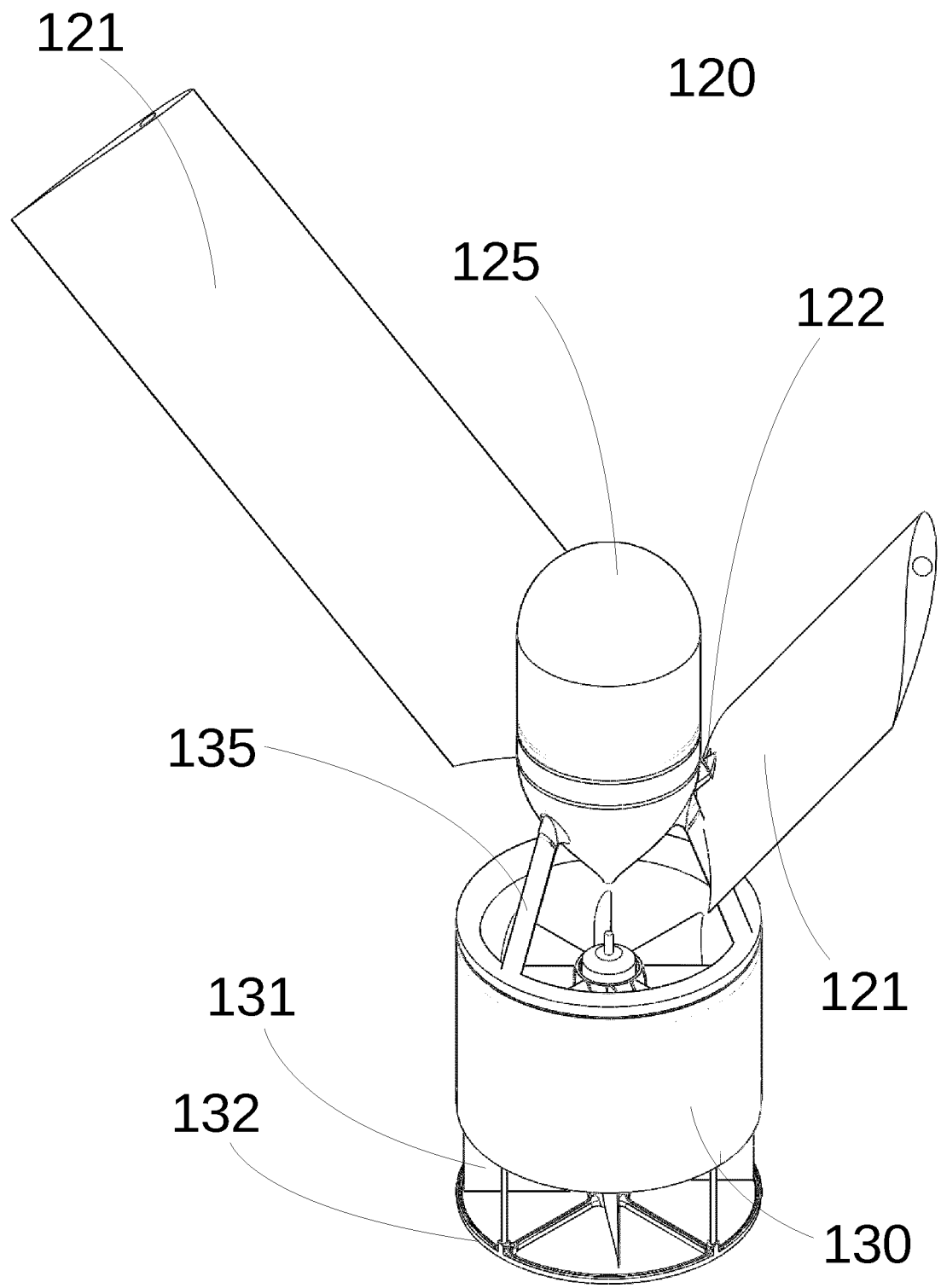
FIG. 6a is a perspective view of the UAV 120 transitioning from the compact state to the extended state.
Figure 6B:
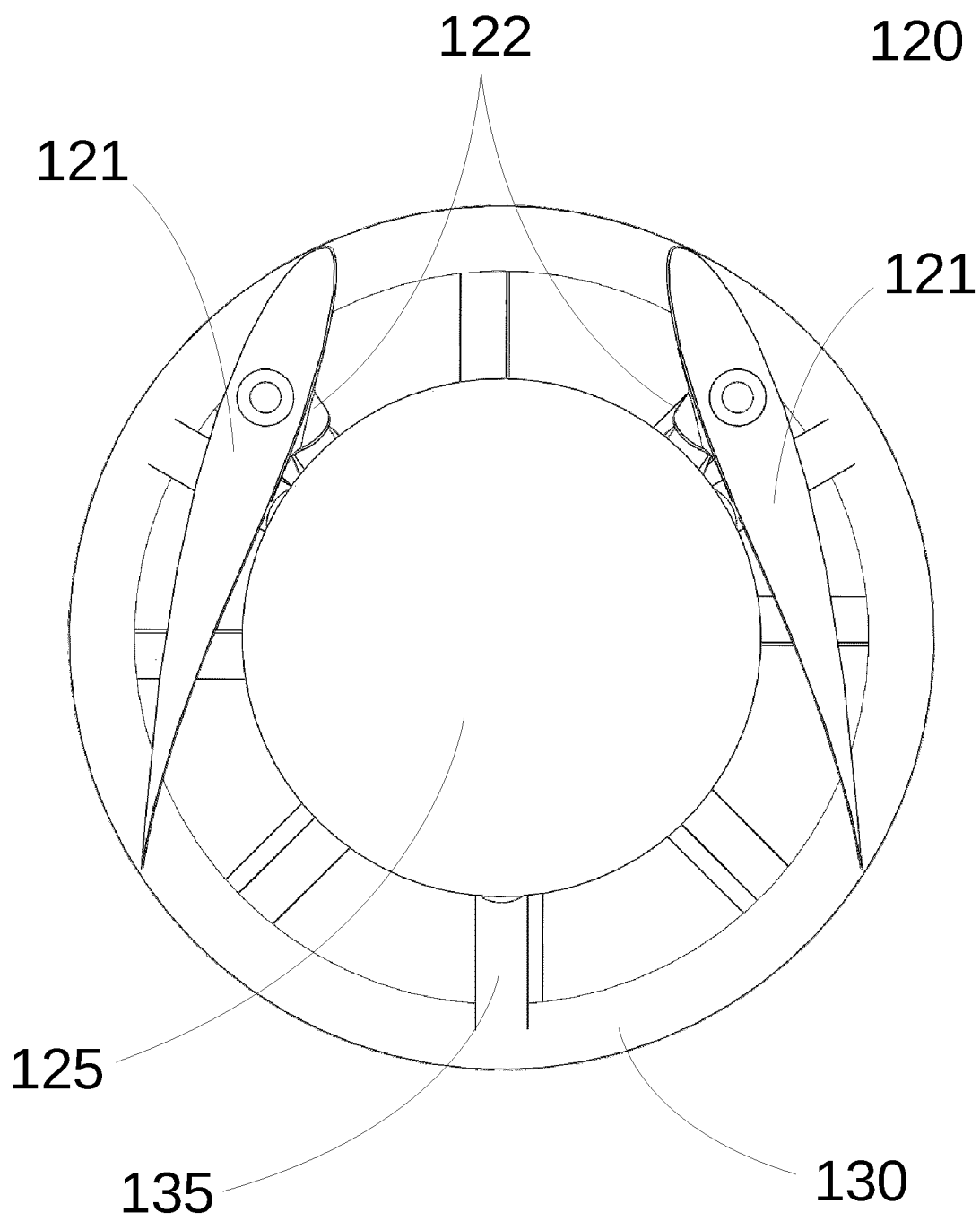
FIG. 6b is a top view of the UAV 120 in the compact state.

The UAV 120 leaves the docking station 20 after the lid 21 has been opened. In some implementations, the UAV 120 can transition from the compact state to an extended state in which the wings 121 are extended outward to provide lift for horizontal flight (similar to a fixed-wing aircraft). FIG. 6 is a side view of the UAV 120 in the extended state and FIG. 6a is a perspective view of the UAV 120 transitioning from the compact state to the extended state. FIG. 6b is a top view of the UAV 120 in the compact state prior to transitioning to the extended state.

Pivot points 122 are used to fold and unfold the wings 121 and may be arranged parallel to each other or tilted as shown in FIGS. 5a and 6a to allow the wings 121 to fold to the side as shown in FIG. 6b or in any position in between. In some implementations, the wings 121 can be rotated around the pivot points 122 by about 90 degrees, although the precise angle can vary to allow some sweep angle adjustment of the wings 121. In other implementations, the pivot points 122 for the wings 121 to unfold or fold up can be tilted in a way that the wings 121 are not parallel when folded up. This would allow bigger wings 121 to be used in the same projected circle area (seen from the top).

The pair of wings 121 can rotate around a common point above each other, or can have separate points to unfold or fold up. In other implementations, the wings 121 rotate around the same pivot point, but slightly offset in the direction of the pivot axis. This will allow the wings 121 to fold above each other and be seen from the top of the UAV 120 when in a horizontal flight mode. In other implementations, one wing 121 is on top of the fuselage (payload bay) 125 and the other is on the bottom of the fuselage (payload bay) 125. Top and bottom of the fuselage (payload bay) 125 are referenced here in the horizontal flight mode. In this implementation, the wings 121 are folded upward when in hover flight mode or in a compact state.

It is pertinent to note that the folding of the wings 121 is not essential. In other implementations, the pair of wings 121 may pop in/out of fuselage 125 without any folding or pivoting. The pair of wings 121 would nonetheless be able to extended outward for the horizontal flight mode.

Once the UAV 120 has transitioned to the extended state in which the wings 121 are extended outward, the UAV 120 can then transition from operating in the hover mode to operating in the horizontal flight mode by slowly tilting its nose down (negative pitch) and gaining speed. The lift is then mostly provided by the wings 121 that are extended outward. In the case of a ducted-fan UAV 120, the thrust generated by the motor in the ducted-fan only has to compensate for wind resistance in the horizontal flight mode. Whereas in the hover mode, the thrust has to compensate for the gravitational force from the weight of the ducted-fan UAV 120. The horizontal flight mode allows the UAV 120 to achieve higher flight speeds, longer range, and longer endurance.

Figure 7:
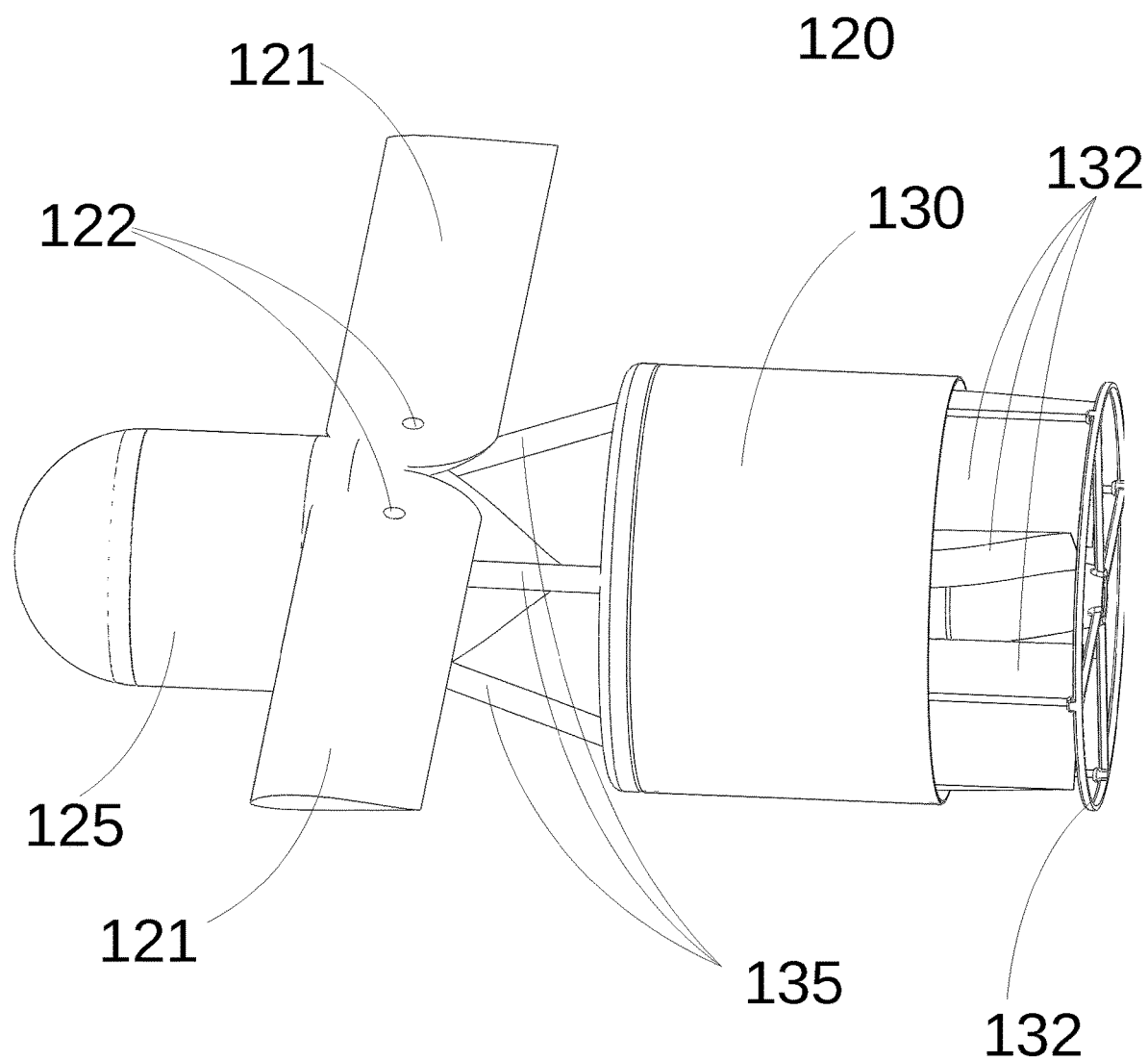
FIG. 7 is a perspective view of the UAV in horizontal flight with its wings deployed in the extended state.

FIG. 7 is a perspective view of the UAV 120 in horizontal flight with its wings 121 deployed in the extended state. The UAV 120 has a fuselage 125, a duct 130 connected to the fuselage 125, a rotating fan or propeller (not shown) disposed within the duct 130 that is configured to provide lift to the UAV 120, and a pair of wings 121 configurable between the extended state and the compact state. In some implementations, the UAV 120 also has stators 135 that interact with the fan/propeller to stabilize airflow between the rotating fan or propeller and a bottom portion 132 of the UAV 120.

The UAV 120 can fly to a destination for some mission, for example surveillance or other mission, and then return to a docking station, which can be the same docking station 20 from which it was deployed or some other docking station. In some implementations, in preparation for docking, the UAV 120 returns to the hover mode by pitching up its nose (positive pitch) and then transitions from the extended state to the compact state so that the UAV 120 can fit in the docking station 20. To recover the UAV 120, the docking station 20 opens its lid 21 and fully deploys the retractable guide apparatus 22. The retractable guide apparatus 22 then physically guides the UAV 120 into a storage compartment 40, where the UAV 120 can be charged and kept on standby for future deployment. Once the UAV 120 is in the storage compartment 40, the retractable guide apparatus 22 retracts and the lid 21 closes.

Figure 8:
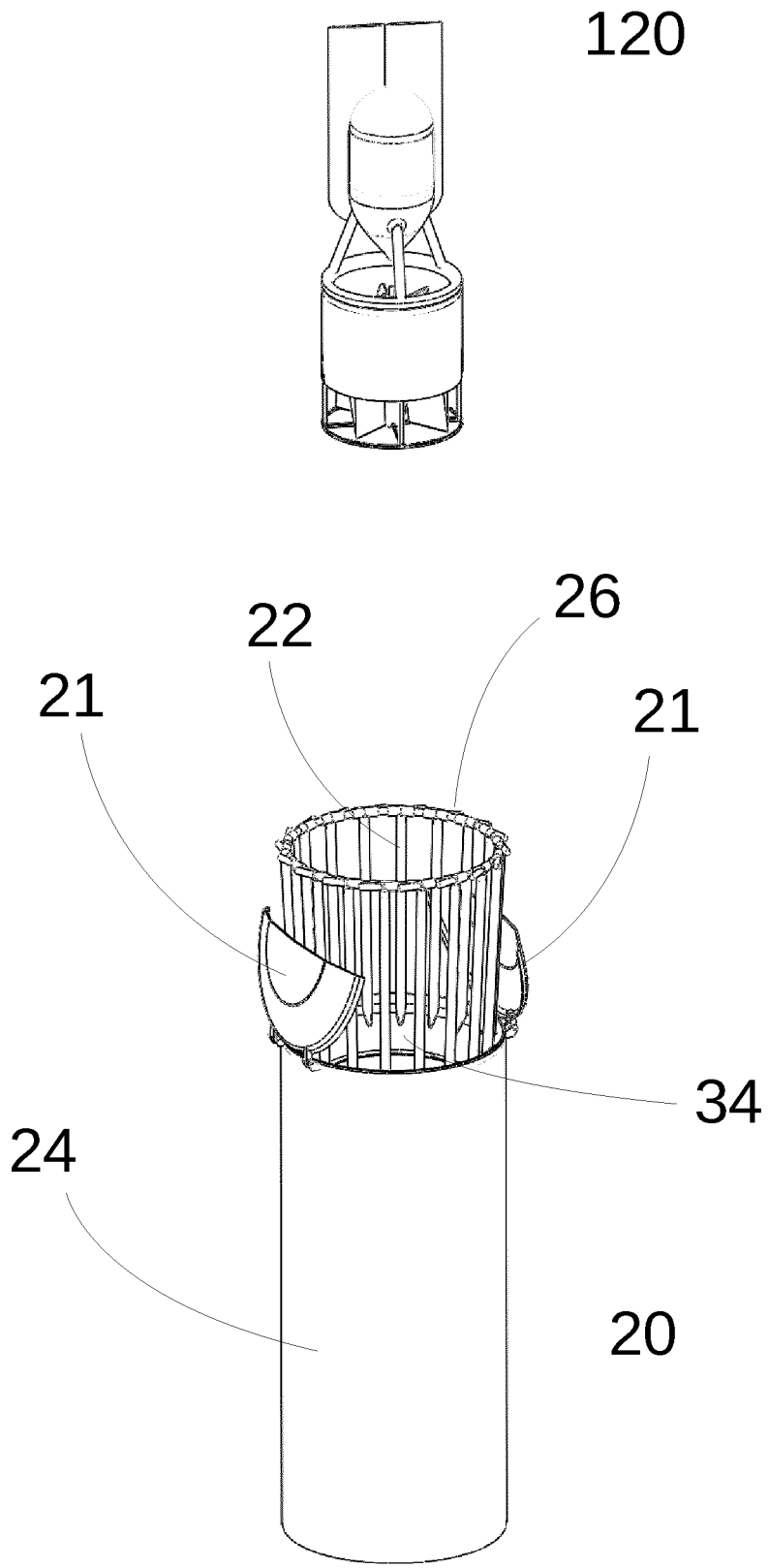
FIGS. 8 and 8a are perspective views of the docking station deploying a retractable guide apparatus while the UAV is waiting to be recovered.
Figure 8A:
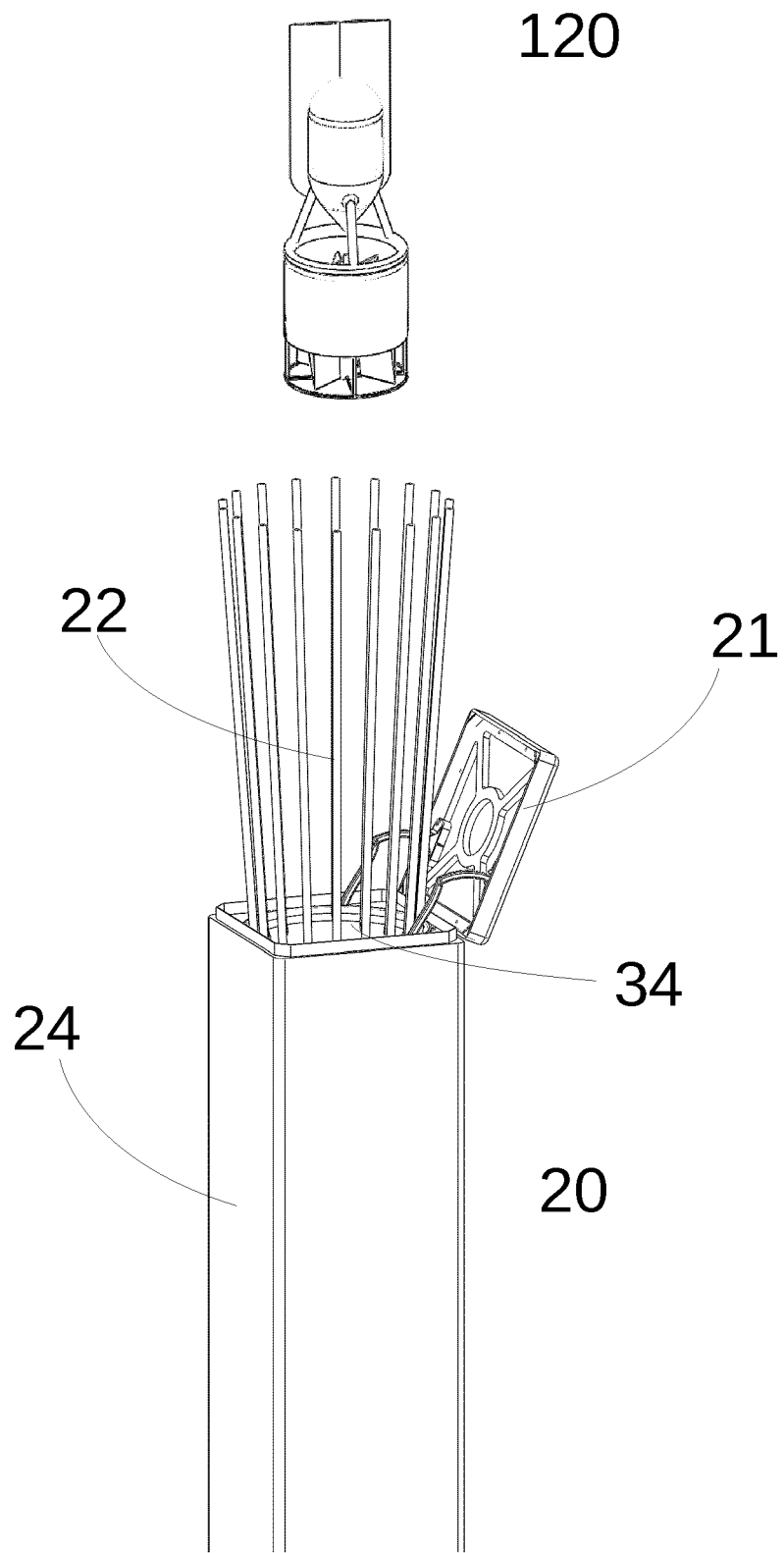
Figure 9:
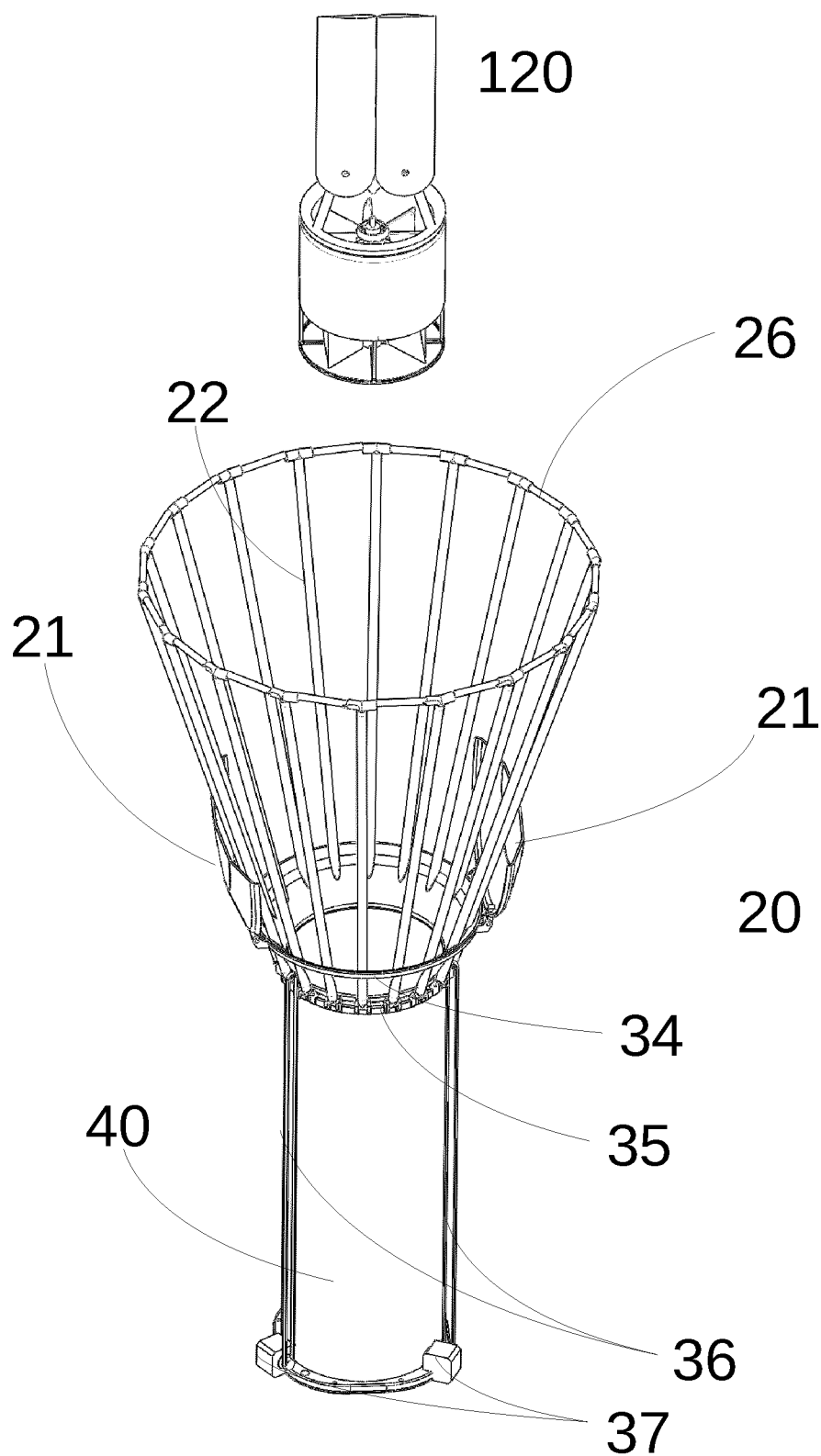
FIG. 9 is a perspective view of the docking station with its outside cover removed showing the retractable guide apparatus fully deployed while the UAV is lining up for recovery.

FIGS. 8 and 8a are perspective views of the docking station 20 deploying the retractable guide apparatus 22 while the UAV 120 is waiting to be recovered. FIG. 9 is a perspective view of the docking station 20 with its outside cover 24 removed showing the retractable guide apparatus 22 fully deployed while the UAV 120 is lining up for recovery. These drawings illustrate how the retractable guide apparatus 22 can transition from a cylindrical shape in a retracted state to a funnel shape in an expanded state. However, more generally, the retractable guide apparatus 22 can be configured to transition between a set of suitable shapes which may depend on the shape of the docking station 20. For example, in other implementations, the shape of the retractable guide apparatus 22 in the expanded state is another frustum shape such as a square frustum, or another suitable shape for physically guiding the UAV 120 into the docking station 20.

Figure 10:
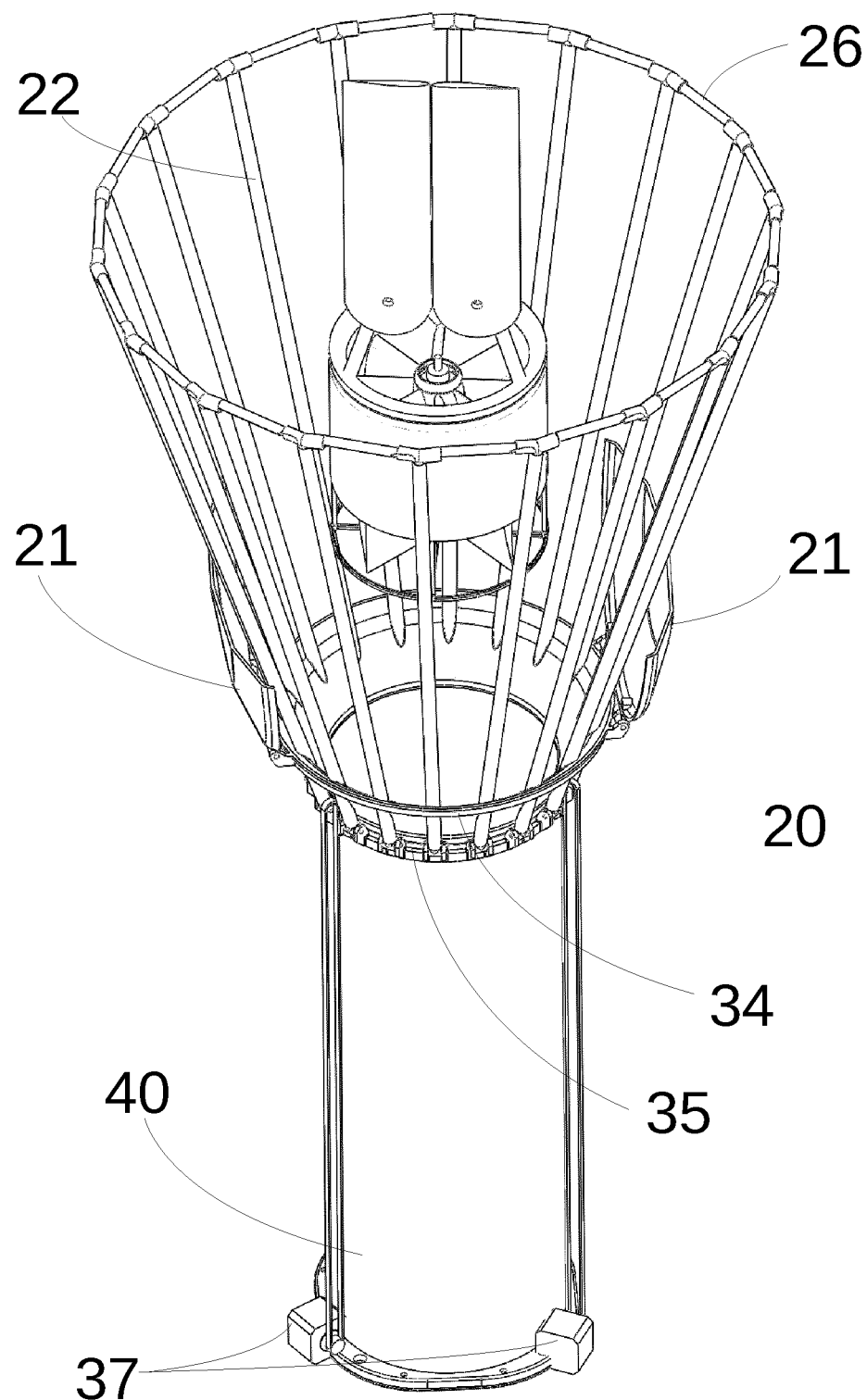
FIG. 10 is a perspective view of the docking station with its outside cover removed showing the retractable guide apparatus fully deployed while the UAV is physically guided into the docking station.

Once the UAV 120 is aligned above the retractable guide apparatus 22, the UAV 120 can descend and be physically guided by the retractable guide apparatus 22 into the docking station 20. FIG. 10 is a perspective view of the docking station 20 with its outside cover 24 removed showing the retractable guide apparatus 22 fully deployed while the UAV 120 is physically guided into the docking station 20. The retractable guide apparatus 22 functions as a funnel for physically guiding the UAV 120 into the docking station 20, such that the UAV 120 does not need to be exactly centred over the docking station 20 during its descent. Once the UAV 120 has descended to being inside the retractable guide apparatus 22 that has been deployed, problems with the so-called ground effect due to windy conditions can be avoided.

Figure 11:
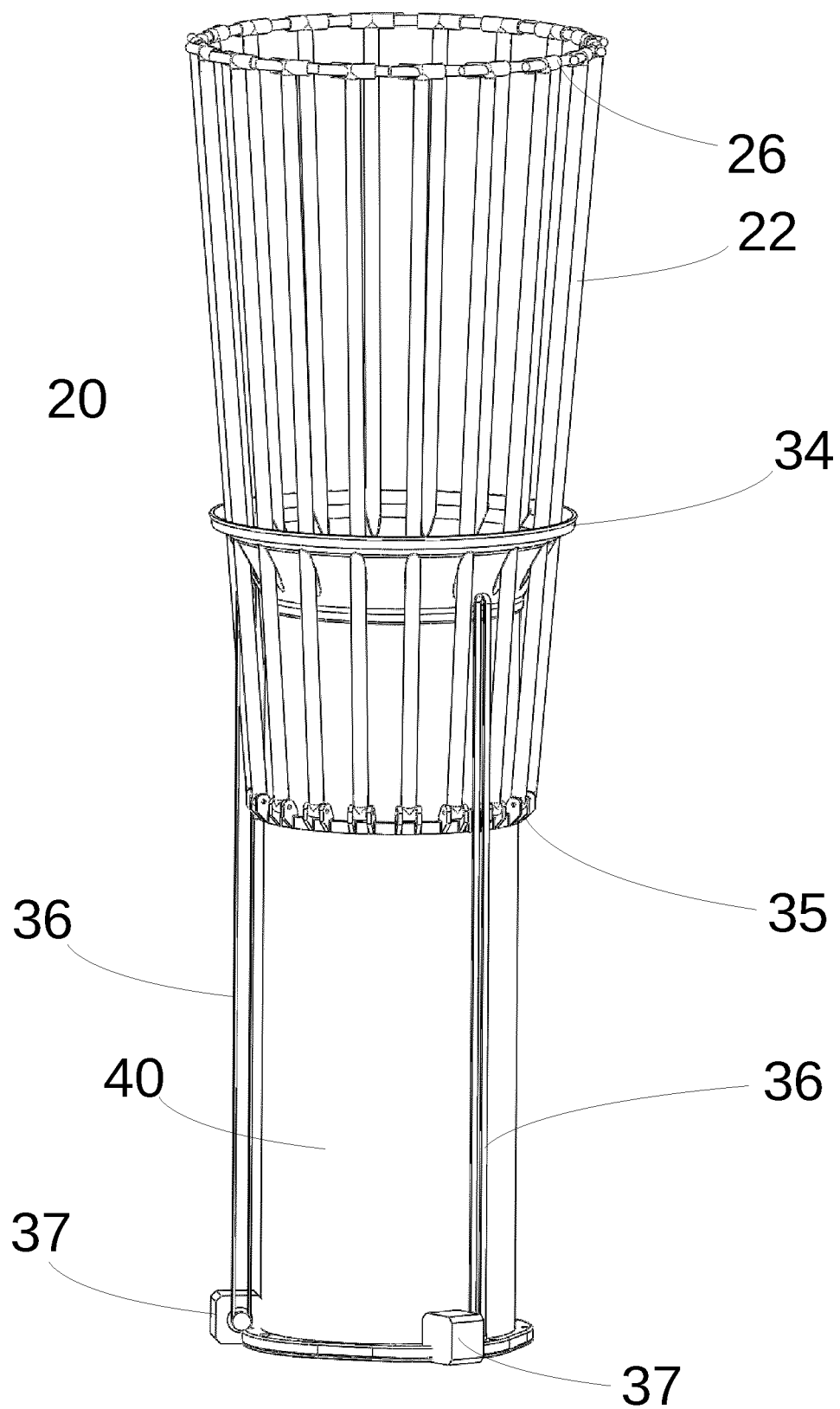
FIG. 11 is a perspective view of the docking station with its outside cover and lid removed while the retractable guide apparatus is in a process of retracting.
Figure 12:
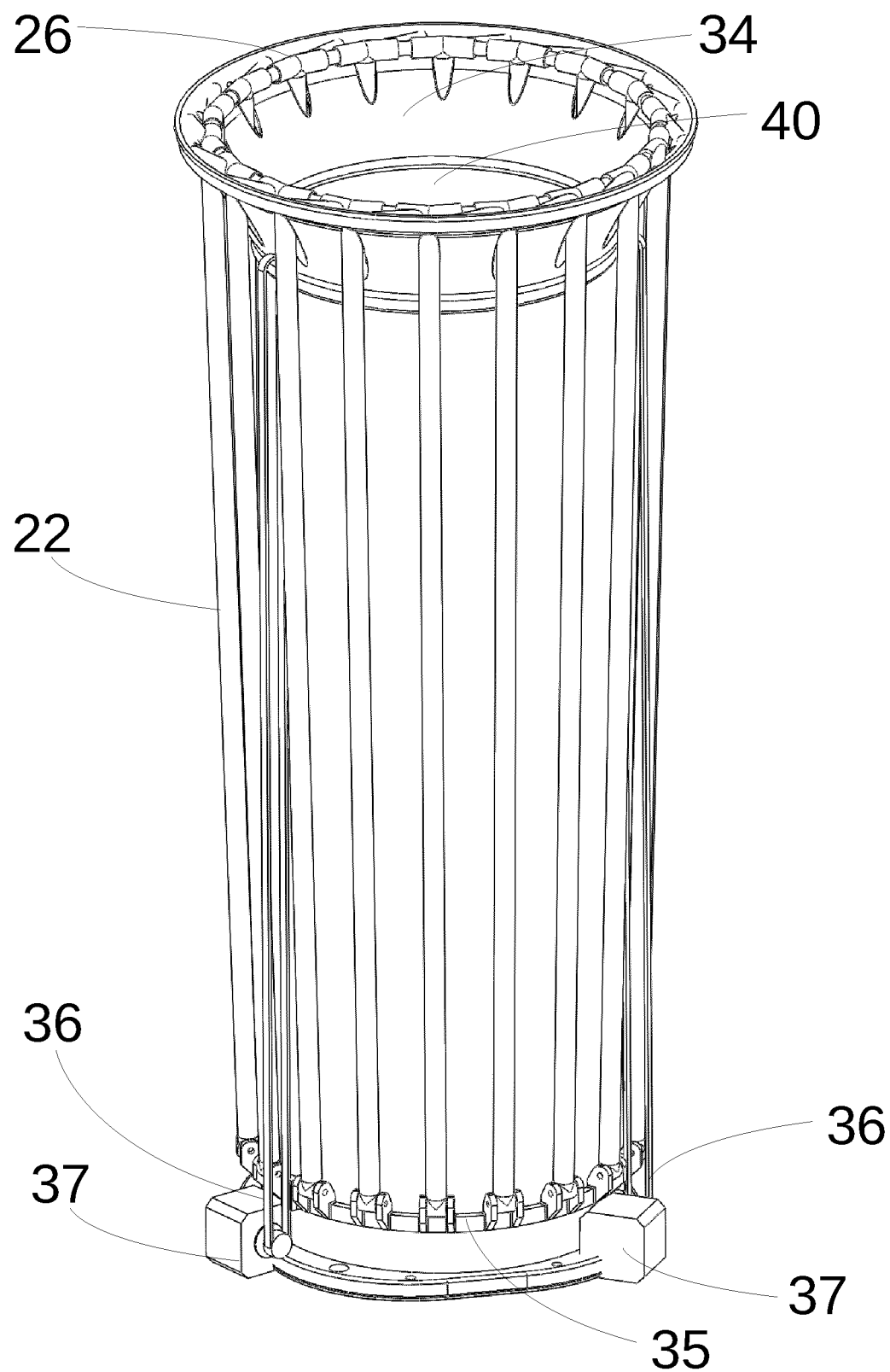
FIG. 12 is a perspective view of the docking station with its outside cover and lid removed while the retractable guide apparatus is fully retracted.

Once the UAV 120 has been physically guided into the docking station 20, the retractable guide apparatus 22 can retract back into the docking station 20. FIG. 11 is a perspective view of the docking station 20 with the outside cover 24 and the lid 21 removed while the retractable guide apparatus 22 is in a process of retracting. FIG. 12 is a perspective view of the docking station 20 with the outside cover 24 and the lid 21 removed while the retractable guide apparatus 22 is fully retracted.

In the illustrated drawings, the retractable guide apparatus 22 extends upwards from the docking station 20 and expands outwards to form the funnel shape that can physically guide the UAV 120 into the docking station 20. The upward extension of the retractable guide apparatus 22 enables the outward expansion from the outside cover 24. However, in other implementations, there is no such upward extension. For instance, in other implementations in which there is no outside cover 24, it is possible to have the outward expansion without any upward extension. Such implementations still involve the guide apparatus 22 being retractable nonetheless, as it can move inward at least on a top portion.

Given that the guide apparatus 22 is retractable, the retractable guide apparatus 22 is provided with some protection from environmental factors such as exposure to ice, snow and high winds. This can help to increase durability and reliability, such that the UAV 120 can reliably land in the docking station 20 without any personnel being present. Deployment is also possible without any personnel being present. Therefore, it is possible to avoid or mitigate the costs associated with personnel.

In addition, given that the guide apparatus 22 is retractable, the docking station 20 can have a small form factor. The small form factor can be suitable for mobile applications, such as when the docking station 20 is fixed to an unmanned vehicle for example, and for other applications as well. Whilst a docking station having a large flat area to land on is possible, this would result in a large system that may not be well suited for mobile applications. In some implementations, as shown in the drawings, the docking station 20 is designed to house a single UAV 120 with a goal to make the docking station 20 as compact as possible. Whilst housing multiple UAVs is possible, this would increase size.

Some aspects of the docking station 20 of the present disclosure are based on a previously disclosed system in WO2018039784A1. However, the docking station 20 of the present disclosure enables the guide apparatus 22 to be retractable, which provides the benefits mentioned above. Also, the docking station 20 of the present disclosure enables a small form factor, which provides additional benefits mentioned above. Therefore, the docking station 20 of the present disclosure offers various advantages over the previously disclosed system.

In some implementations, while the UAV 120 is housed within the docking station 20, at least some actions are performed by the docking station 20 which might further circumvent any need for personnel to be present. As an example, the docking station 20 can charge a battery of the UAV 120 and/or provide fuel for the UAV 120. This can avoid involvement of a person for charging/replacing the battery and/or fueling the UAV 120. Example details of charging are provided below with reference to FIGS. 13 to 15, and further details of fueling are provided below with reference to FIGS. 18 to 20.

In some implementations, the lid 21 of the docking station 20 is automatically actuated to open when the UAV 120 is being guided into the docking station 20 with the retractable guide apparatus 22 in the expanded state or when the UAV 120 is being launched from inside the docking station 20. Example details are provided below with reference to FIGS. 16 and 17. In other implementations, the docking station 20 has no such lid 21.

In some implementations, the docking station 20 has a communication system configured to communicate with the UAV 120 to convey information concerning location of the docking station 20. Such information can be used by the UAV 120 to locate the docking station 20 when returning and docketing with the docking station 20. Example details are provided below with reference to FIG. 21. In other implementations, the UAV 120 uses visual processing to locate the docking station 20.

Retractable Guide Apparatus

Further example details of the retractable guide apparatus 22 will now be provided. It is to be understood at the outset that these details are very specific and are provided merely as an example.

In some implementations, as shown in the drawings, the retractable guide apparatus 22 has a plurality of elongated guides configured to expand outward from the docking station 20 to form the funnel shape for the expanded state. In some implementations, each elongated guide is a wire or a pipe. In other implementations, each elongated guide is a telescopic pipe.

In some implementations, a bottom portion of the retractable guide apparatus 22 is connected to a push ring 35. Several elongated guides form the retractable guide apparatus 22 and are guided on the top by circular openings in a frustum 34. The elongated guides can be round or other shape, and their length and diameter can vary. There are eighteen elongated guides shown in the drawings, although this number can vary. All elongated guides are connected with a hinge to the push ring 35. The push ring 35 is slightly larger than the outside of the storage compartment 40.

The flexibility to have a desirable shape and length of the retractable guide apparatus 22 makes the docking station 20 suitable for mobile applications. Also, for stationary applications, where automatic deicing of a funnel may normally be performed, having an option to have a desirable funnel shape can help in avoiding an overly complex operation of deicing. Having a fixed funnel apparatus can significantly increase a height of the docking station 20 height, which could be acceptable for stationary applications, but the additional height may prevent the docking station 20 from being used in mobile applications.

In other implementations, the elongated guides of the retractable guide apparatus 22 are telescopic devices similar to automatic telescopic antennas. They are also arranged in a circular design or another design (e.g. oval or square design), but a desired angle of the funnel shape of the retractable guide apparatus 22 can be fixed in place. When the guide apparatus 22 is retracted, the top of the telescopic guides stick out slightly from the frustum 34. When the retractable guide apparatus 22 is deployed, it extends to an appropriate length and forms a desired shape. The number of telescope segments is not fixed and can vary.

In some implementations, a top portion of the elongated guides is connected to a rim 26. The rim 26 is optional, but has two possible purposes. One purpose is to stabilize the top of the retractable guide apparatus 22 when it is deployed and to avoid having the UAV 120 from getting stuck if it misses its approach and hits the top of the retractable guide apparatus 22. Unlike landing pads currently available in the market which may prescribe UAVs to land extremely precisely, on the order of 10 to 20 cm, to avoid hitting structures at the edge landing pad or falling off the landing pad, the retractable guide apparatus 22 and the rim 26 enables room for some misalignment and still functions when the UAV 120 is not extremely precise when landing. Another purpose of the rim 26 is for it to be used as optical guidance for the UAV 120. This may prove useful in the case of a multi-rotor UAV (which is larger), where landing the UAV may involve more precision to avoid reaching an edge or even falling over the edge of their landing pads.

In some implementations, the frustum 34 is hollow and cylindrical and has openings for the elongated guides of the retractable guide apparatus 22 to be deployed. In some implementations, the frustum 34 may be conical, pyramidal, square or any other suitable shape. The openings of the frustum 34 are circularly arranged. These openings are tilted a few degrees and arranged in a slightly larger diameter than the diameter of the push ring 35 as shown in FIGS. 9 to 12. This ensures that when the elongated guides of the retractable guide apparatus 22 are deployed by rising, the push ring 35 arranges the retractable guide apparatus 22 to have an opening angle of about 15 to 45 degrees. The opening angle of the retractable guide apparatus 22, its shape, its length, and the maximum size of the resulting rim 26 can vary.

The push ring 35 is moved up or down by a single or a set of linear actuators 36 and 37 to deploy or retract the funnel. The linear actuators 36 and 37 may include a belt/lead screw 36 and a motor 37 that drive and actuate the retractable guide apparatus 22. Different types of motors may be used to open the lid 21, for example a stepper or a servo motor. In some implementations, three linear actuators are used to avoid twisting the push ring 35. This makes it possible to change the shape of the retractable apparatus 22 by intentionally twisting the push ring 35 with the linear actuators. The linear actuators 36 and 37 function to move the retractable guide apparatus 22 upward out of the outside cover 24 for the expanded state and downward into the outside cover 24 for the retracted state, wherein a controller is coupled to the linear actuators 36 and 37 for selecting between the retracted state and the expanded state. The lid 21 covering the top portion of the outside cover 24 is automatically actuated to open when the UAV 120 is being guided into the docking station 20 with the retractable guide apparatus 22 in the expanded state or when the UAV 120 is being launched from inside the docking station 20.

The rim 26 can be made of different materials and different objects. In some implementations, the rim 26 has a simple rope that is connected to the top of the retractable funnel/guide apparatus 22 and has a circular shape. The length of the rope is selected such that it tightens when the funnel is completely deployed and loosens when it is retracted. In other implementations, the rim 26 is supported by multiple ropes, wires, pipes or telescopic pipes extending between the rim 26 and the docking station 20.

Depending on the specific arrangement, a rope for the rim 26 may cause problems when it is loose when the retractable guide apparatus 22 is retracted. In some implementations, the rope can be replaced with a stretchable rope, which would have a slight amount of tension even when the guides of the retractable apparatus 22 are fully retracted. For example, the rope can be replaced with an elastic band or an elastic rope to keep it under tension even when the retractable guide apparatus 22 is retracted. The elastic rope or elastic band may be combined with an outer-braided sleeve that stiffens when it is stretched to a certain length. Ideally, this particular length will be reached when the guides of the retractable apparatus 22 are fully deployed to achieve a stiff rim 26.

In other implementations, the rim 26 has a braided sleeve without an inside core. When the guides of the retractable apparatus 22 are retracted, the sleeve would be compressed, which would increase the diameter of the sleeve, but will prevent bending of the sleeve and avoid interference when deploying the UAV 120.

In some implementations, the rim 26 is configured to have a telescopic-rigged connection that extends to its full length when the guides of the retractable apparatus 22 are fully deployed. Regardless of the material used, the rim 26 may be colored or made reflective to allow precise landing by using visual object detection.

In other implementations, the rim 26 has a series of tubes that fit inside each other to generate a telescopic mechanism that allows the rim 26 to extend the length of the sections between the ends of the guides of the retractable apparatus 22. It also allows the length between the ends of the guides of the retractable guide apparatus 22 to be retracted.

It is pertinent to note, that the elongated guides are dispensable, as the expanded and the retracted states can be accomplished without employing the elongated guides. For example, the elongated guides could be replaced with a sheet of material that can be rolled up into a cylinder and manipulated to form a conical shape.

Charging System

Figure 13:
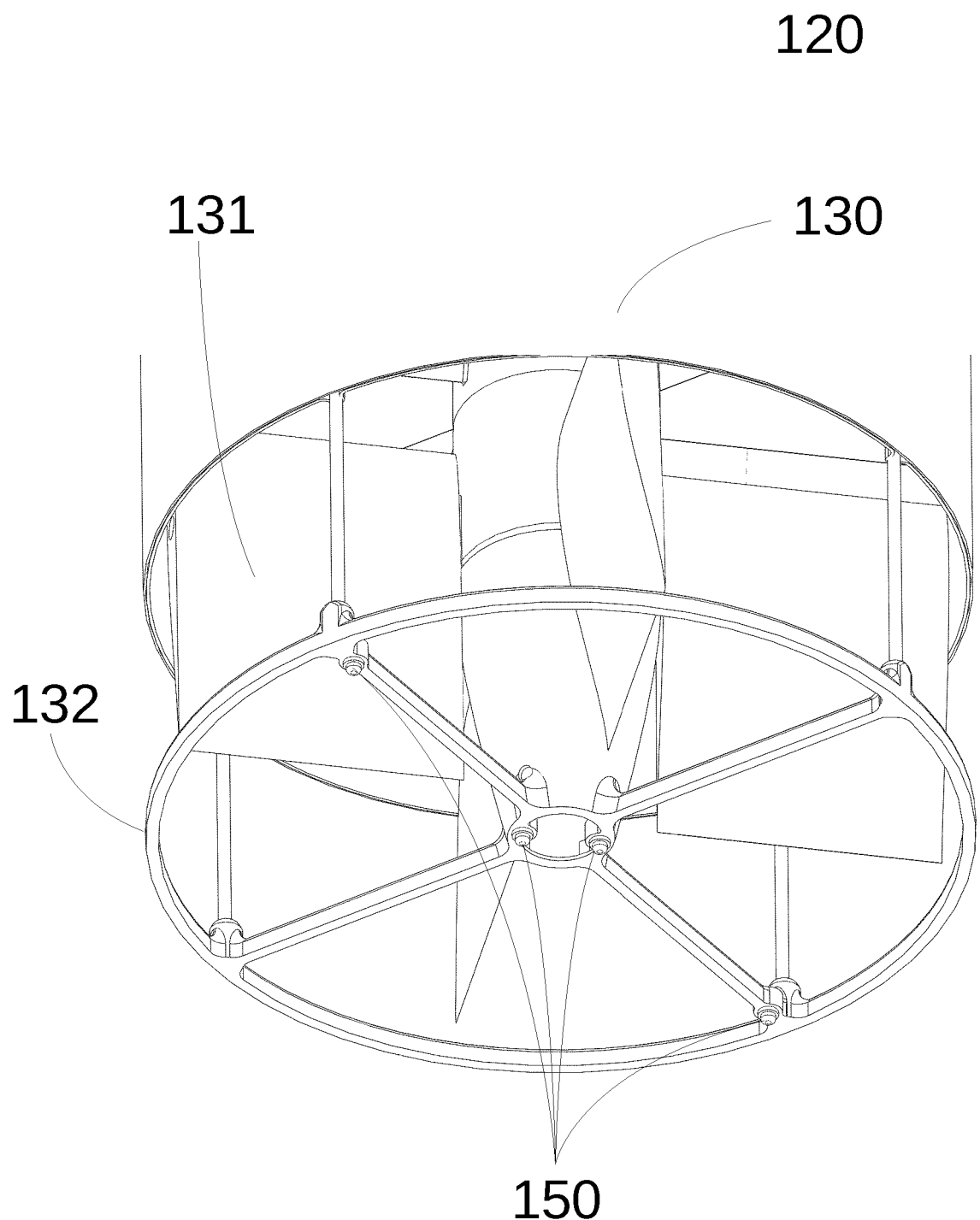
FIG. 13 is a perspective view of an underside of the UAV with contacts for charging a battery of the UAV.
Figure 14:
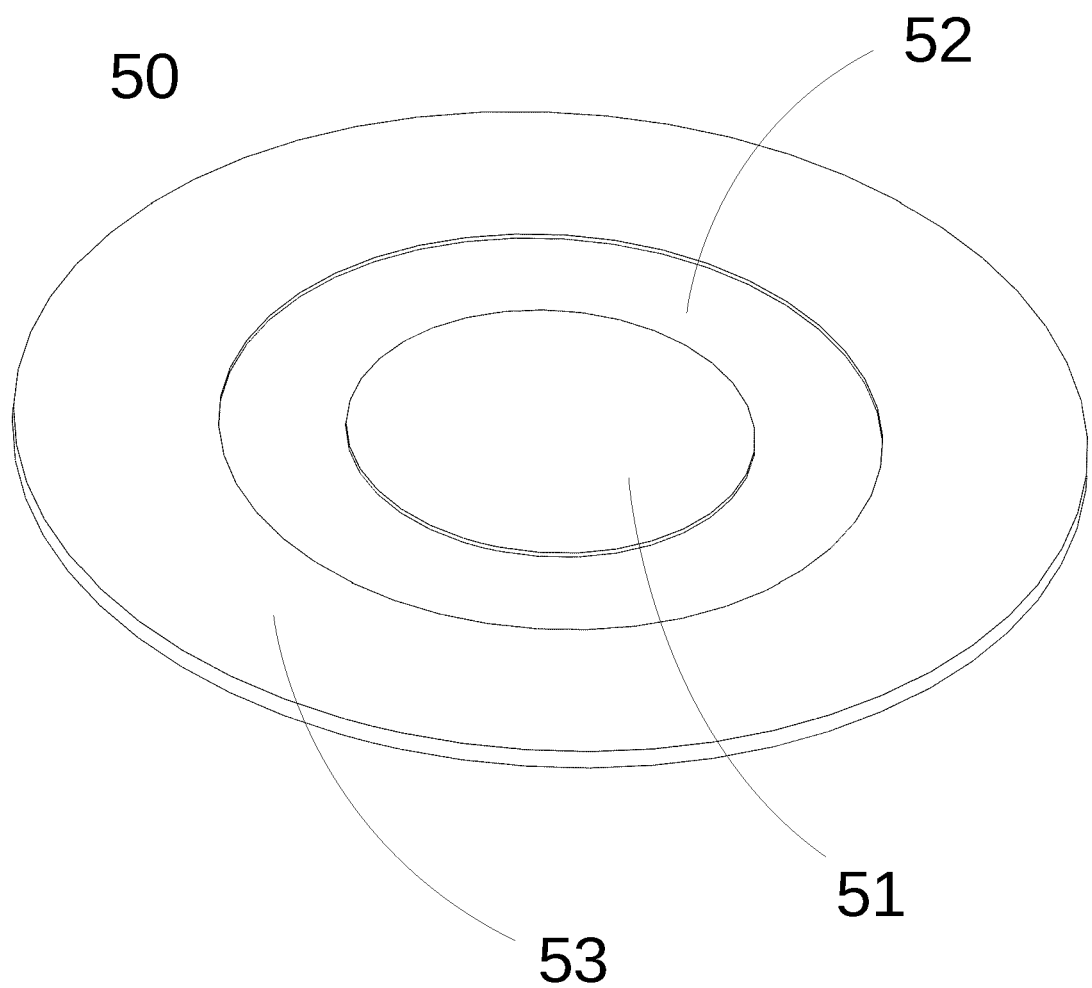
FIG. 14 is a perspective view of a charging pad inside the docking station.
Figure 15:
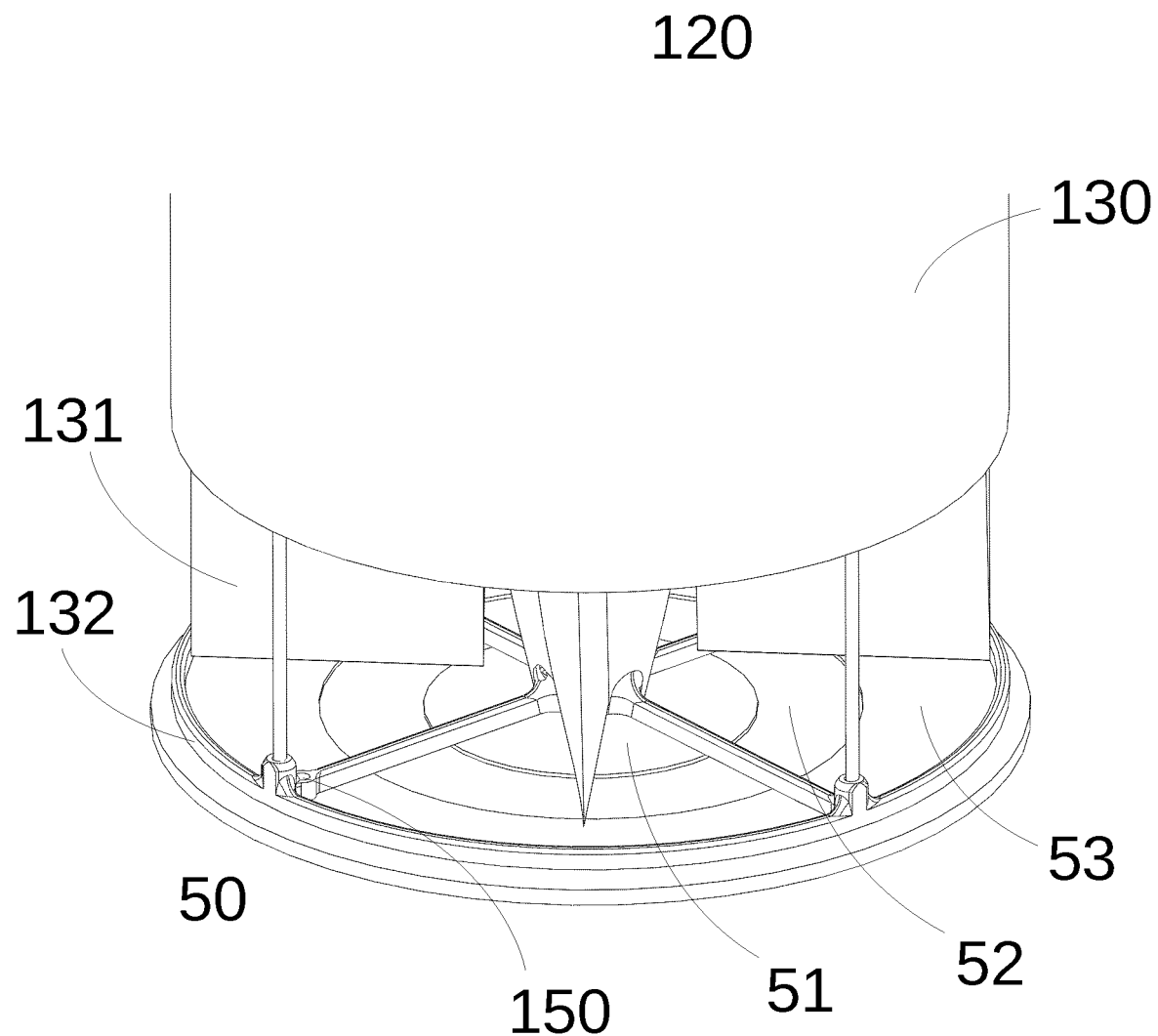
FIG. 15 is a perspective view of the UAV on top of the charging pad inside the docking station.

In some implementations, the docking station 20 has a charging system configured to charge the UAV 120. FIG. 13 is a perspective view of an underside of the UAV 120 with contacts 150 for charging a battery of the UAV 120. FIG. 14 is a perspective view of a charging pad 50 inside the docking station 20. FIG. 15 is a perspective view of the UAV 120 on top of the charging pad 50 inside the docking station 20.

The contacts 150 of the bottom portion 132 of the UAV 120 electrically connect with the charging pad 50 inside the docking station 20, such that the battery of the UAV 120 can be charged. In particular, inner contacts 150 of the bottom portion 132 electrically connect with an inner conductive area 51 of the charging pad 50, while outer contacts 150 of the bottom portion 132 electrically connect with an outer conductive area 53 of the charging pad 50. The charging pad 50 also has an insulating circular area 52.

In some implementations, the circular arrangement of the insulated circular area 52 and the conductive areas 51/53 can ensure that in any possible position the contacts 150 of the UAV 120 electrically connect with the corresponding conductive areas 51/53. In some implementations, the conductive areas 51/53 and the insulated circular area 52 have widths that are configured such that the connections are ensured and no short circuitry is possible, even when the UAV 120 is not exactly concentric in the docking station 20. The contacts 150 can be arranged in different ways, and multiple contacts 150 may be used.

The charging system is a contact based system which relies on the fact that the UAV 120 is automatically centered inside the docking station 20. However, it is to be understood that other charging systems are possible and are within the scope of the discloser.

Lid Actuation Mechanism

Figure 16:
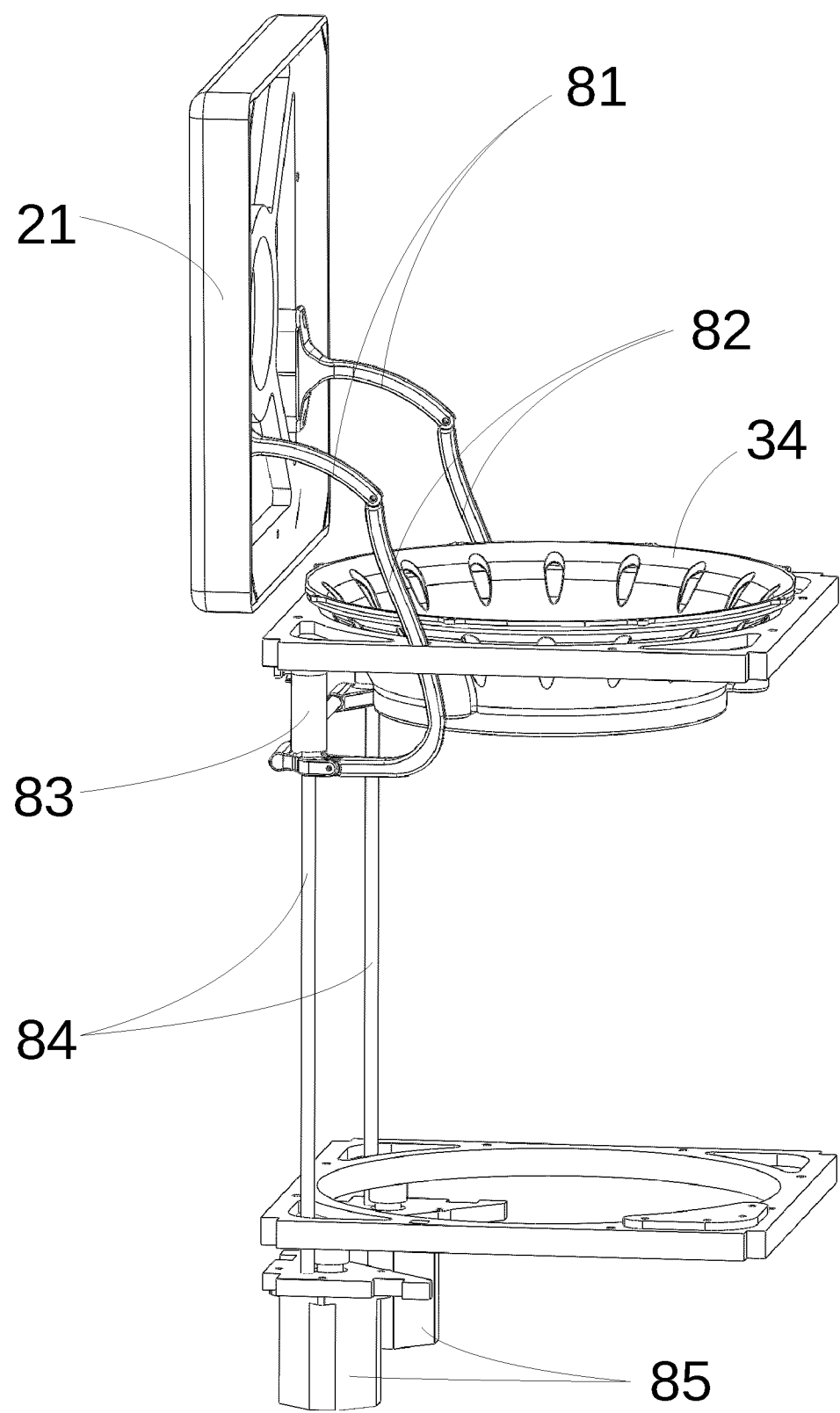
FIG. 16 is a perspective view of a lid actuation mechanism inside the docking station when the lid is open.
Figure 17:
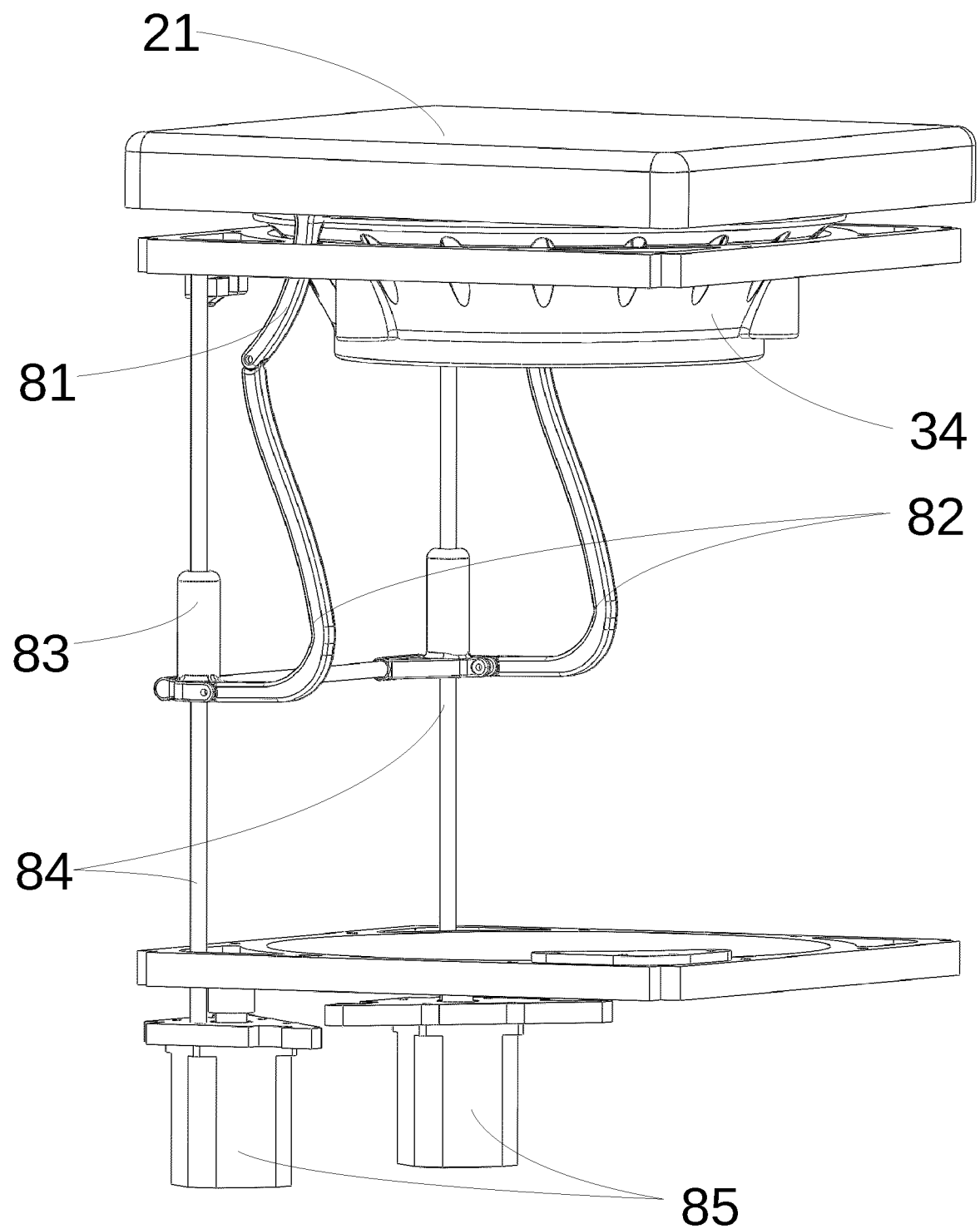
FIG. 17 is a perspective view of the lid actuation mechanism inside the docking station when the lid is closed.

FIG. 16 shows a perspective view of a lid actuation mechanism inside the docking station 20 when the lid 21 is open. FIG. 17 shows a perspective view of the lid actuation mechanism inside the docking station 20 when the lid 21 is closed. In some implementations, the lid 21 automatically opens when deploying the UAV 120 and closes after deployment. Also, in some implementations, the lid 21 automatically opens when recovering the UAV 120, before deploying the retractable guide apparatus 22, and closes once the retractable guide apparatus 22 has been retracted after the UAV 120 has been recovered.

In some implementations, the lid 21 is electrically-actuated. The lid actuation mechanism has a first push arm 81 and a second push arm 82, both of which are attached to an inner side of the lid 21 from its first end. A second end of the push arms 81 and 82 are each connected to a lead screw nut housing 83. Each lead screw nut housing 83 is slidably attached to a lead screw 84 and allows movement of push arms 81 and 82 along a length of the lead screw 84 thus facilitating opening and closing of the lid 21. A pair of lead screws 84 are placed parallel to each other between the outer cover 24 and a pair of actuators 85. When the lid 21 is open, the first end of the push arms 81 and 82 is pulled outwards thus causing the second end of the push arms 81 and 82 to move upwards along the length of the lead screws 84. When the lid 21 is closed, the first end of the push arms 81 & 82 is pushed inside causing the second end of the push arms 81 and 82 to move downwards along the length of the lead screws 84.

In other implementations, the lid 21 is spring loaded. A spring normally keeps the lid 21 closed, but the lid 21 is opened by either the UAV 120 pushing it open when leaving the docking station 20 or when the docking station 20 deploys the retractable guide apparatus 22 and pushes the lid 21 open. Other implementations are possible.

When the lid 21 is open, the frustum 34 and the top portion of the retractable guide apparatus 22 with the rim 26 are visible (versions without a rim may be also possible).

Fueling System & Locking Mechanism

Figure 18:
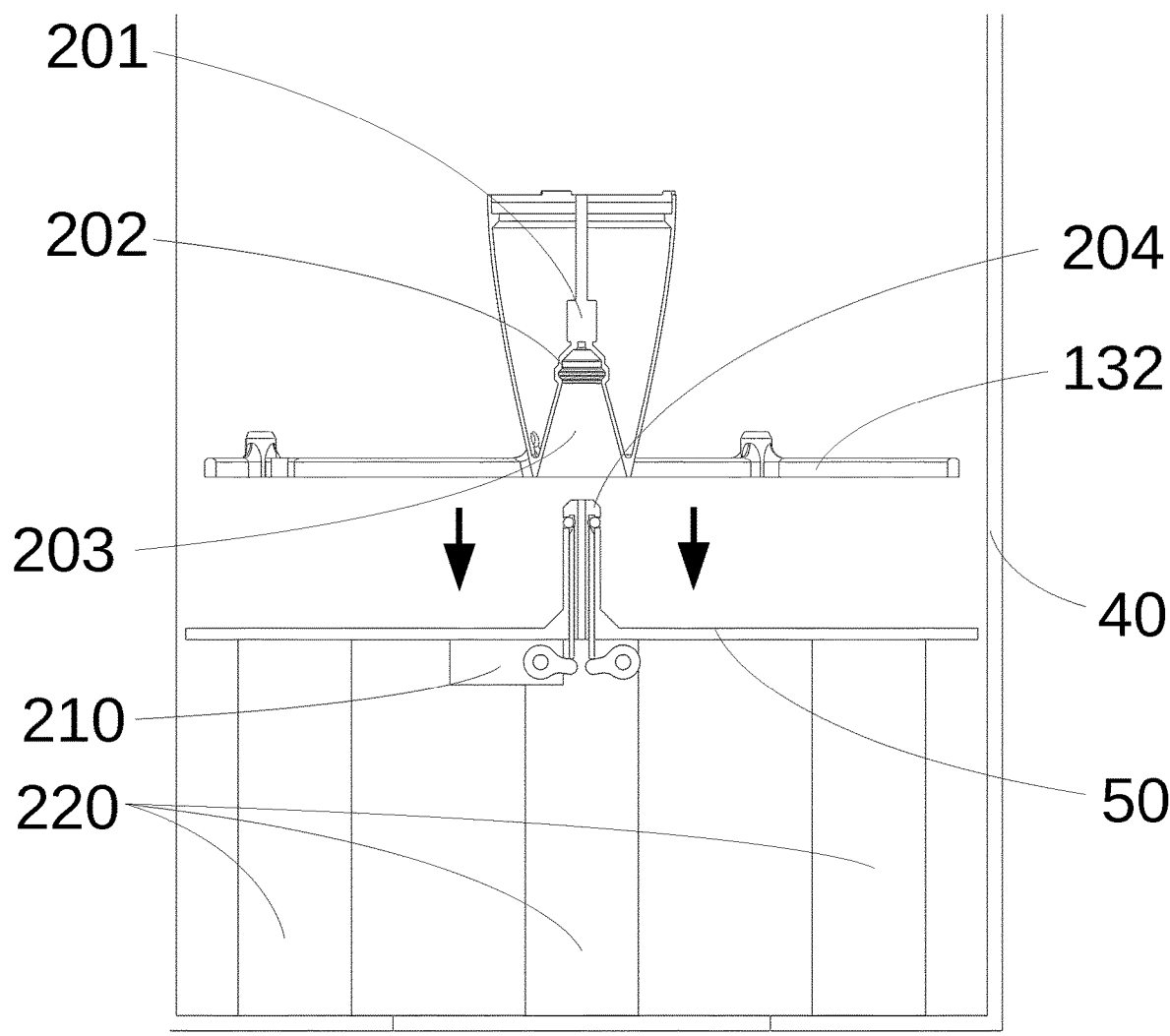
FIG. 18 is a cut view of a fueling system inside the docking station while the UAV is descending.

FIG. 18 is a cut view of a fueling system 200 when the UAV 120 is descending into the docking station 20. The UAV 120 descends inside the docking station 20 onto a landing pad 50 and a dampening system 220 which reduces an impact of the landing. The fueling system 200 has a check valve 201 connected to a groove or locking mechanism 202 which is funnel shaped 203. The locking mechanism 202 can ensure that fuel lines are properly sealed during fueling. The funnel shape 203 of the groove or locking mechanism 202 and a refueling probe 204 of the landing pad 50 ensures that even with a small possible misalignment the UAV 120 land in the right position on the landing pad 50. Once the UAV 120 lands on the landing pad 50, a lock actuator 210 locks the UAV 120 in place so that it doesn't move or slip over the edge of the landing pad 50.

In some implementations, the dampening system 220 includes any suitable padding material such as polyurethane or foam. In some implementations, the lid 21 presses a bit on a top portion of the UAV 120 and together with the dampening system 220 below the UAV 120, the UAV 120 is held in place.

In other implementations, the dampening system 220 includes an inflatable bag with openings that are adjusted to the weight of the UAV 120 to dampen. The inflatable bag is inflated and kept inflated by a radial fan/blower during the landing of the UAV 120. The dampening system 220 dampens the landing, by forcing out the air through its openings. Once the UAV 120 has landed on the docking station 20 the inflatable bag of the dampening system 220 is deflated. The inflatable bag used for dampening might be placed between two plates to evenly distribute the forces and may contain a replenishment system.

Figure 19:
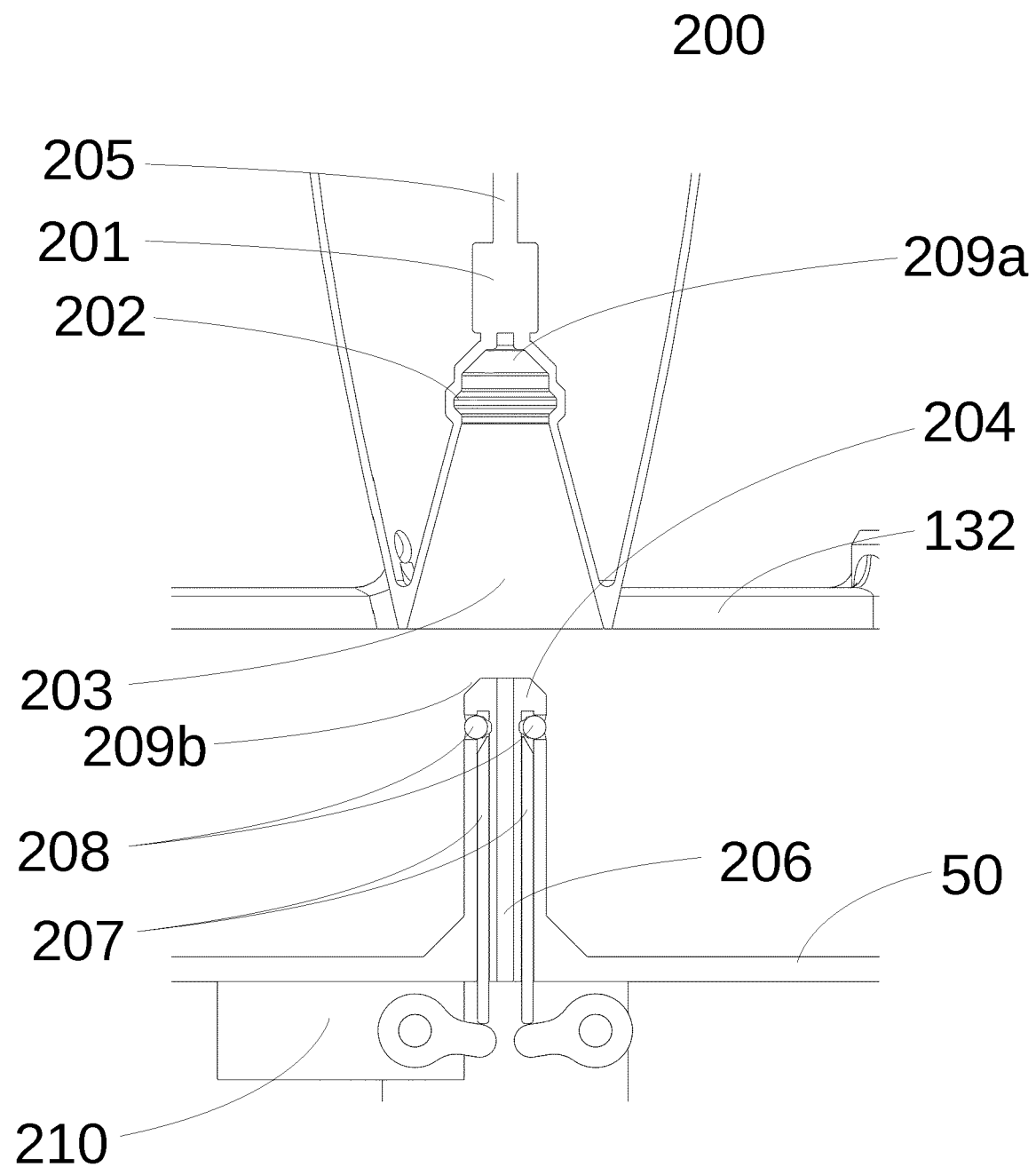
FIG. 19 is a detailed view of the fueling system inside the docking station.

FIG. 19 is a detailed view of the fueling system 200. A fuel pipe 205 of the UAV 120 tank extends from the check valve 201 which is connected to the funnel-shaped groove or locking mechanism 202. The UAV 120 is refueled when the fuel pipe 205 is connected to the fuel pipe 206 of the docking station 20. The fuel pipe 206 of the docking station 20 is connected internally to a fuel pump or fuel storage compartment. The UAV 120 is locked in place on the landing pad 50 with the help of push rods 207 which are placed on either side of the fuel pipe 206 of the docking station 20. The push rods 207 in sync with the lock actuator 210 locks the UAV 120 in place on the landing pad 50. The locking mechanism is further strengthened using steel balls 208 which interlock with the groove 202 of the UAV 120. In some implementations, the push rods 207 push the steel balls 208 outward to lock it, because without that the UAV 120 could be still pushed up by fuel pressure during a fueling process. The funnel-shaped groove/locking mechanism 202 has a sealing surface 209a which assists in locking the UAV 120 on the landing pad 50 by aligning with the sealing surface 209b of the refueling probe 204.

Figure 20:
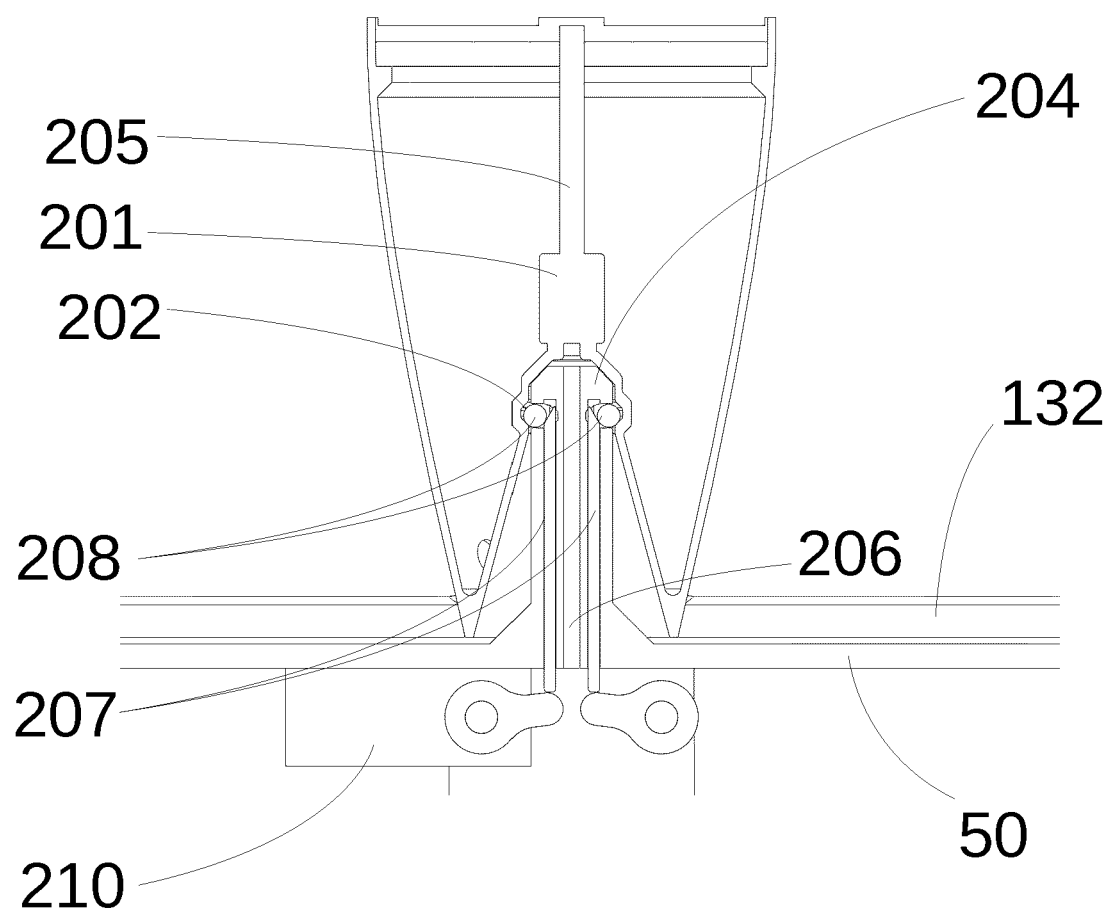
FIG. 20 is a cut view of a locking mechanism where landing gear of the UAV is locked on a refueling probe of the landing pad.

FIG. 20 is a cut view of the locking mechanism where the landing gear of the UAV 120 is locked on the refueling probe 204 of the landing pad 50. Once the UAV 120 is landed, the lock actuator 210 pushes the pushrods 207 upward which pushes the steel balls 208 to the outside into the groove 202. This locks the UAV 120 into place and ensures that sealing surfaces 209a and 209b provide a proper seal for the refueling. The fuel is then pumped into the UAV 120. The UAV 120 is configured to monitor a fuel level and communicates with the docking station 20 to stop the refueling by the fueling system 200. The check valve 201 prevents draining of the fuel tank of the UAV 120 and also ensures that no fuel is lost during flight or storage. The fueling system 200 may employ gasoline, kerosene, hydrogen or any other suitable fuel for refueling the UAV 120.

In some implementations, the docking station 20 can be used in any position/altitude, which includes using the docking station 20 sideways, or upside down, or at any other altitude. A locking mechanism as shown in FIG. 20 can be utilized to hold the UAV 120 in the storage compartment 40 and to avoid having the UAV 120 from unintentionally slipping from or falling out of the storage compartment 40. In this case the locking mechanism may be on the top of the UAV 120, in the case where the docking station 20 is upside down.

Further Details

Figure 21:
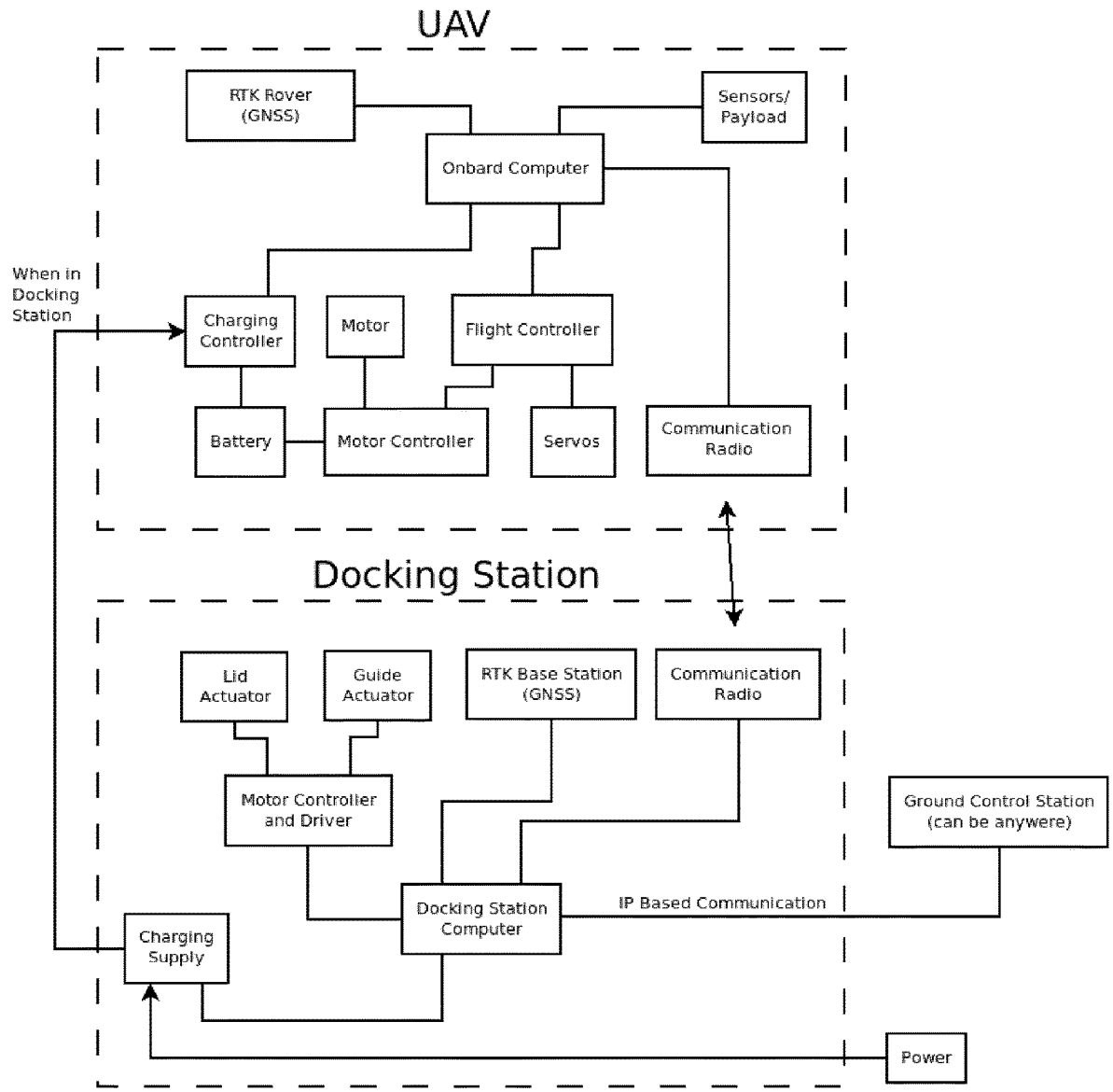
FIG. 21 is a block diagram of the UAV and the docking station.

FIG. 21 is a block diagram of the UAV 120 and the docking station 20. The block diagram is very specific and is provided merely as an example. The UAV 120 has an onboard computer, sensors, a motor and motor controller, a flight controller and servos, and may have other components as well. The docking station 20 has a docking station computer, a motor controller and driver, a lid and guide actuator, and may have other components as well.

The UAV 120 communicates with the docking station 20 via an electronic communication system as shown. The electronic communication system is configured to convey information concerning location of the docking station 20. In some implementations, the communication system also has a global navigation satellite system (GNSS) receiver with real time kinematic (RTK) base station capability. In specific implementations, the GNSS receiver provides RTK correction data.

Communication between the UAV 120 and the docking station 20 is established via communication radios. The docking station 20 is also configured to communicate with a ground control station which can be located anywhere. In other implementations, the communication system is further configured to communicate with a local operator, or with a remote operator in a central location. In other implementations, there may be no such communication with any operator, such as when there is full autonomy for example.

In another embodiment, the docking station 20 can be used to recover, deploy and charge other types of vehicles like quadrotors with ducts, underwater vehicles, etc.

Numerous modifications and variations of the present disclosure are possible in light of the above teachings. It is therefore to be understood that within the scope of the appended claims, the disclosure may be practised otherwise than as specifically described herein.

I claim:

1. A docking station for use with an unmanned aerial vehicle (UAV), the docking station comprising:
    a retractable guide apparatus having a retracted state in which the retractable guide apparatus is retracted within the docking station and an expanded state in which the retractable guide is expanded outward from the docking station for physically guiding the UAV into the docking station,
    wherein the retractable guide apparatus comprises a plurality of elongated guides, a push ring connected to a bottom portion of each of the plurality of elongated guides, and one or more actuators connected to the push ring and configured to move the push ring along a vertical direction, wherein in the retracted state an upper portion of each of the elongated guides is slidingly received in a guiding feature of a guiding structure arranged around a UAV opening, and the guiding features of the guiding structure are arranged in a shape having a slightly larger diameter than the push ring, such that when the push ring moves upwardly from the retracted state the guiding features cause upper ends of the elongated guides to splay outwardly as they move upwardly into the expanded state.

2. The docking station of claim 1, wherein the retractable guide apparatus is configurable into a frustum shape for the expanded state.

3. The docking station of claim 2, wherein the frustum shape is a funnel.

4. The docking station of claim 2, wherein the retractable guide apparatus is configurable into a cylinder for the retracted state.

5. The docking station of claim 1, wherein the retractable guide apparatus comprises a rim connecting a top end of each of the plurality of elongated guides in a circular shape.

6. The docking station of claim 5, wherein the rim comprises a rope that tightens when the retractable guide apparatus is in the expanded state and loosens when in the retracted state.

7. The docking station of claim 5, wherein the rim comprises a telescopic-rigged connection that extends to a full length when the retractable guide apparatus is in the expanded state.

8. The docking station of claim 1, wherein each elongated guide comprises a wire or a pipe.

9. The docking station of claim 5, wherein the rim is supported by multiple ropes, wires, pipes or telescopic pipes extending between the rim and the docking station.

10. The docking station of claim 5, wherein the rim is colored or made reflective to facilitate visual detection of the docking station.

11. The docking station of claim 1, further comprising:
    an outside cover having an opening at a top portion;
    wherein the retractable guide apparatus is enclosed within the outside cover during the retracted state and extends upward out of the top portion of the outside cover for the expanded state.

12. The docking station of claim 11, further comprising:
    a controller coupled to the one or more actuators for selecting between the retracted state and the expanded state.

13. The docking station of claim 12, wherein the actuator comprises a linear actuator including a belt or lead screw and a motor to drive and actuate the retractable guide apparatus.

14. The docking station of claim 12, further comprising:
    a lid for covering the top portion of the outside cover;
    wherein the lid is automatically actuated to open when the UAV is being guided into the docking station with the retractable guide apparatus in the expanded state or when the UAV is being launched from inside the docking station.

15. The docking station of claim 14, wherein the lid is spring-loaded such that the lid is held closed but can be opened by the UAV pushing the lid open when leaving the docking station or the retractable guide apparatus pushing the lid open.

16. The docking station of claim 14, further comprising:
    another actuator for opening and closing the lid;
    wherein the controller is coupled to the other actuator for selecting whether the lid is to be open or closed.

17. The docking station of claim 11, wherein the outside cover comprises a cylinder shape or a rectangular prism shape.

18. The docking station of claim 1, further comprising:
a charging system configured to charge the UAV when the UAV is inside the docking station.

19. The docking station of claim 18, wherein the charging system comprises:
a plate positioned below the UAV when the UAV is inside the docking station, wherein the plate comprises two circular conductive areas that electrically connect to outer contacts on a bottom portion of the UAV.

20. The docking station of claim 1, further comprising:
a fueling system configured to fuel the UAV when the UAV is inside the docking station.

21. The docking station of claim 20, comprising:
a locking mechanism to ensure that fuel lines are properly sealed during fueling.

22. The docking station of claim 1, further comprising:
a communication system configured to communicate with the UAV to convey information concerning location of the docking station.

23. The docking station of claim 22, wherein the communication system is further configured to communicate with a local operator or with a remote operator in a central location.

24. The docking station of claim 22, wherein the communication system comprises a global navigation satellite system (GNSS) receiver with real-time kinematic (RTK) base station capability.

25. The docking station of claim 24, wherein the GNSS receiver provides RTK correction data to the UAV.

26. The docking station of claim 1, further comprising:
a dampening apparatus to dampen impact of the UAV when landing in the docking station.

27. The docking station of claim 26, wherein the dampening apparatus comprises foam.

28. A system comprising:
an unmanned aerial vehicle (UAV); and
a docking station comprising a retractable guide apparatus having a retracted state in which the retractable guide apparatus is retracted within the docking station and an expanded state in which the retractable guide is expanded outward from the docking station for physically guiding the UAV into the docking station,
wherein the retractable guide apparatus comprises a plurality of elongated guides, a push ring connected to a bottom portion of each of the plurality of elongated guides, and one or more actuators connected to the push ring and configured to move the push ring along a vertical direction, wherein in the retracted state an upper portion of each of the elongated guides is slidingly received in a guiding feature of a guiding structure arranged around a UAV opening, and the guiding features of the guiding structure are arranged in a shape having a slightly larger diameter than the push ring, such that when the push ring moves upwardly from the retracted state the guiding features cause upper ends of the elongated guides to splay outwardly as they move upwardly into the expanded state.

29. The system of claim 28, wherein the UAV comprises a fuselage, a duct connected to the fuselage, a rotating fan or propeller disposed within the duct and configured to provide lift to the UAV, and a pair of wings configurable between an extended state in which the wings are extended outward to provide lift for horizontal flight and a compact state in which the wings are not extended outward to allow the UAV to fit into the docking station.

* * * * *